United States Patent
Gelosi

(10) Patent No.: US 10,650,186 B2
(45) Date of Patent: May 12, 2020

(54) DEVICE, SYSTEM AND METHOD FOR DISPLAYING SECTIONED DOCUMENTS

(71) Applicant: Handycontract LLC, Reno, NV (US)

(72) Inventor: Patrizio Gelosi, Phan Rang (VN)

(73) Assignee: Handycontract, LLC, Reno, NV (US)

( * ) Notice: Subject to any disclaimer, the term of this patent is extended or adjusted under 35 U.S.C. 154(b) by 0 days.

(21) Appl. No.: 16/243,648

(22) Filed: Jan. 9, 2019

(65) Prior Publication Data

US 2019/0377779 A1 Dec. 12, 2019

Related U.S. Application Data

(60) Provisional application No. 62/682,753, filed on Jun. 8, 2018.

(51) Int. Cl.
| | |
|---|---|
| *G06F 17/00* | (2019.01) |
| *G06F 40/137* | (2020.01) |
| *G06F 40/51* | (2020.01) |
| *G06F 40/58* | (2020.01) |
| *G06F 40/106* | (2020.01) |

(52) U.S. Cl.
CPC .......... *G06F 40/137* (2020.01); *G06F 40/106* (2020.01); *G06F 40/51* (2020.01); *G06F 40/58* (2020.01)

(58) Field of Classification Search
CPC ............. G06F 17/2247; G06F 17/2241; G06F 17/289; G06F 17/2854; G06F 17/212
See application file for complete search history.

(56) References Cited

U.S. PATENT DOCUMENTS

| | | |
|---|---|---|
| 5,392,387 A | 2/1995 | Fitzpatrick et al. |
| 5,634,064 A | 5/1997 | Warnock et al. |
| 5,794,050 A | 8/1998 | Dahlgren et al. |
| 6,298,357 B1 | 10/2001 | Wexler et al. |
| 6,442,574 B1 | 8/2002 | Schumacher et al. |

(Continued)

OTHER PUBLICATIONS

Ilieva, et al, "Natural Language Processing and Formal Concept Analysis Technologies for Automatic Building of Domain Model," downloaded Jan. 8, 2019 from https://www.researchgate_net/publication/252065457_Natural_Language_Processing_and_Formal_Concept_Analysis_Technologies_for_Automatic_Building_of_Domain_Model, 11 pages.

(Continued)

*Primary Examiner* — Mohammed H Zuberi

(74) *Attorney, Agent, or Firm* — Banner & Witcoff, Ltd.

(57) ABSTRACT

Some aspects described herein may include a computer implemented method to display documents. Aspects may include determining section hierarchies of a document and generating a first view of a section hierarchy. The first view may include a hierarchy title; a portion of text associated with each respective section; and an interface element associated with a first section. Based on a selection of the first section, the system may generate a second view including a portion of text associated with the first section; a first portion of text associated with a first subsection of the first section; and a second portion of text associated with the first subsection. The second portion of text may be determined based on at least one warning criteria. The second view may include a warning panel indicating the warning criteria associated with the second portion of text and visual indicia indicating the correspondence.

21 Claims, 19 Drawing Sheets

(56) References Cited

U.S. PATENT DOCUMENTS

| | | | |
|---|---|---|---|
| 7,027,974 | B1 | 4/2006 | Busch et al. |
| 7,260,773 | B2 | 8/2007 | Zernik |
| 7,743,327 | B2 | 6/2010 | Meunier et al. |
| 7,860,855 | B2 | 12/2010 | Hussami |
| 7,937,653 | B2 | 5/2011 | Dejean et al. |
| 8,060,506 | B1 | 11/2011 | Chang et al. |
| 8,209,608 | B1 | 6/2012 | Linyard et al. |
| 8,302,002 | B2 | 10/2012 | Dejean et al. |
| 8,706,475 | B2 | 4/2014 | Dejean et al. |
| 9,229,916 | B2 | 1/2016 | DeLuca et al. |
| 9,563,351 | B2 | 2/2017 | Migos et al. |
| 9,736,331 | B2 | 8/2017 | Zernik |
| 2004/0216057 | A1* | 10/2004 | Wyle ............... G06F 16/40 715/810 |
| 2006/0248070 | A1* | 11/2006 | Dejean ............ G06F 16/313 |
| 2007/0188473 | A1 | 8/2007 | Anwar |
| 2009/0319910 | A1* | 12/2009 | Escapa ............ G06F 17/241 715/751 |
| 2010/0146435 | A1 | 6/2010 | Cros |
| 2010/0268528 | A1 | 10/2010 | Raskina et al. |
| 2011/0270876 | A1* | 11/2011 | Gill ................ G06F 16/33 707/769 |
| 2012/0297335 | A1 | 11/2012 | Ramasubramanian et al. |
| 2013/0007087 | A1 | 1/2013 | van den Brink et al. |
| 2015/0046681 | A1 | 2/2015 | King |
| 2015/0121204 | A1 | 4/2015 | O'Donoghue et al. |
| 2015/0379652 | A1* | 12/2015 | Follis ............. G06Q 50/18 705/311 |
| 2016/0041700 | A1* | 2/2016 | Beavers ........... G06F 3/0483 715/838 |
| 2016/0048482 | A1 | 2/2016 | Tsui |
| 2016/0232630 | A1* | 8/2016 | Admon ............ G06Q 50/18 |
| 2019/0042554 | A1* | 2/2019 | Aylett ............. G06F 17/248 |

OTHER PUBLICATIONS

Yildiz, et al, "Ontology-Driven Information Systems: Challenges and Requirements," downloaded Jan. 8, 2019 from https://publik.tuwien.ac.at/files/pub-inf_4601.pdf, 11 pages.

Bayer, et al, "Semantic language models with deep neural networks," ScienceDirect, vol. 40, Nov. 2016, 42 pages.

Song et al, "An ontology-driven framework towards building enterprise semantic information layer," ScienceDirect vol. 27, Issue 1, Jan. 2013, pp. 38-50.

Siblini, et al, "Using a Weighted Semantic Network for Lexical Semantic Relatedness," Proceedings of Recent Advances in Natural Language Processing, Hissar, Bulgaria, Sep. 7-13, 2013, pp. 610-618.

"Text Classification using Neural Networks," downloaded Jan. 8, 2019 from https://machinelearnings.co/text-classification-using-neural-networks-f5cd7b8765c6, 12 pages.

Jurafsky, et al, "Regular Expressions, Text Normalization, Edit Distance", Speech and Language Processing, downloaded Jan. 8, 2019 from https://web.stanford.edu/~jurafsky/slp3/2.pdf, 2018, 28 pages.

Bird, et al, "Regular Expressions for Natural Language Processing", downloaded Jan. 8, 2019 from http://courses.ischool.berkeley.edu/i256/f06/papers/regexps_tutorial.pdf, 2006, 7 pages.

"Regular expressions and automata", downloaded Jan. 8, 2019 from http://www.cs.upc.edu/~gatius/mai-inlp/FSModels2.pdf, 39 pages.

Kaur, Gaganpreet, "Usage of Regular Expressions in NLP", International Journal of Research in Engineering and Technology, vol. 03, Issue 01, Jan. 2014, pp. 168-174.

Cimiano, et al, "Learning Concept Hierarchies from Text Corpora using Formal Concept Analysis", Journal of Artificial Intelligence Research, vol. 24, 2005, 2 pages.

Navigli, et al, "Learning Domain Ontologies from Document Warehouses and Dedicated Web Sites," MIT Press, Computational Linguistics, vol. 30, Issue 2, Jun. 2004, pp. 151-179.

Xu, et al, "A Personalized Researcher Recommendation Approach in Academic Contexts: Combining Social Networks and Semantic Concepts Analysis", Association for Information Systems Electronic Library, presented at Pacific Asia Conference on Information Systems 2010, 14 pages.

Saha, et al, "Athena: An Ontology-Driven System for Natural Language Querying over Relational Data Stores," Proceedings of the VLDB Endowment, vol. 9, No. 12, 2016, pp. 1209-1220.

Stanford CoreNLP—Natural Language software, downloaded Jan. 8, 2019 from https://stanfordnlp.github.io/CoreNLP/, 4 pages.

Zhang, et al, "A Survey of Semantic Similarity and its Application to Social Network Analysis," 2015 IEEE International Conference on Big Data, 978-1-4799-9926-2/15, pp. 2362-2367.

Tushkanova, et al, "Data-driven semantic concept analysis for automatic actionable ontology design", downloaded Jan. 8, 2019 from https://ieeexplore.ieee.org/document/7344893, 9 pages.

Capuano, et al, "Ontology-driven Generation of Training Paths in the Legal Domain", downloaded Jan. 8, 2019 from http://dx.doi.org/10.3991/ijet.v10i7.4609, 9 pages.

Obitko, et al, "Ontology Design with Formal Concept Analysis", CLA 2004, VSB—Technical University of Ostrava, Department of Computer Science, pp. 111-119.

Maind, et al, " Measurement of Semantic Similarity Between Words: A Survey", International Journal of Computer Science, Engineering and Information Technology, vol. 2, No. 6, Dec. 2012, pp. 51-60.

Budanitsky, Alexander, "Lexical Semantic Relatedness and Its Application in Natural Language Processing", downloaded from ftp://ftp.cs.utoronto.ca/csrg-technical-reports/390, 158 pages.

* cited by examiner

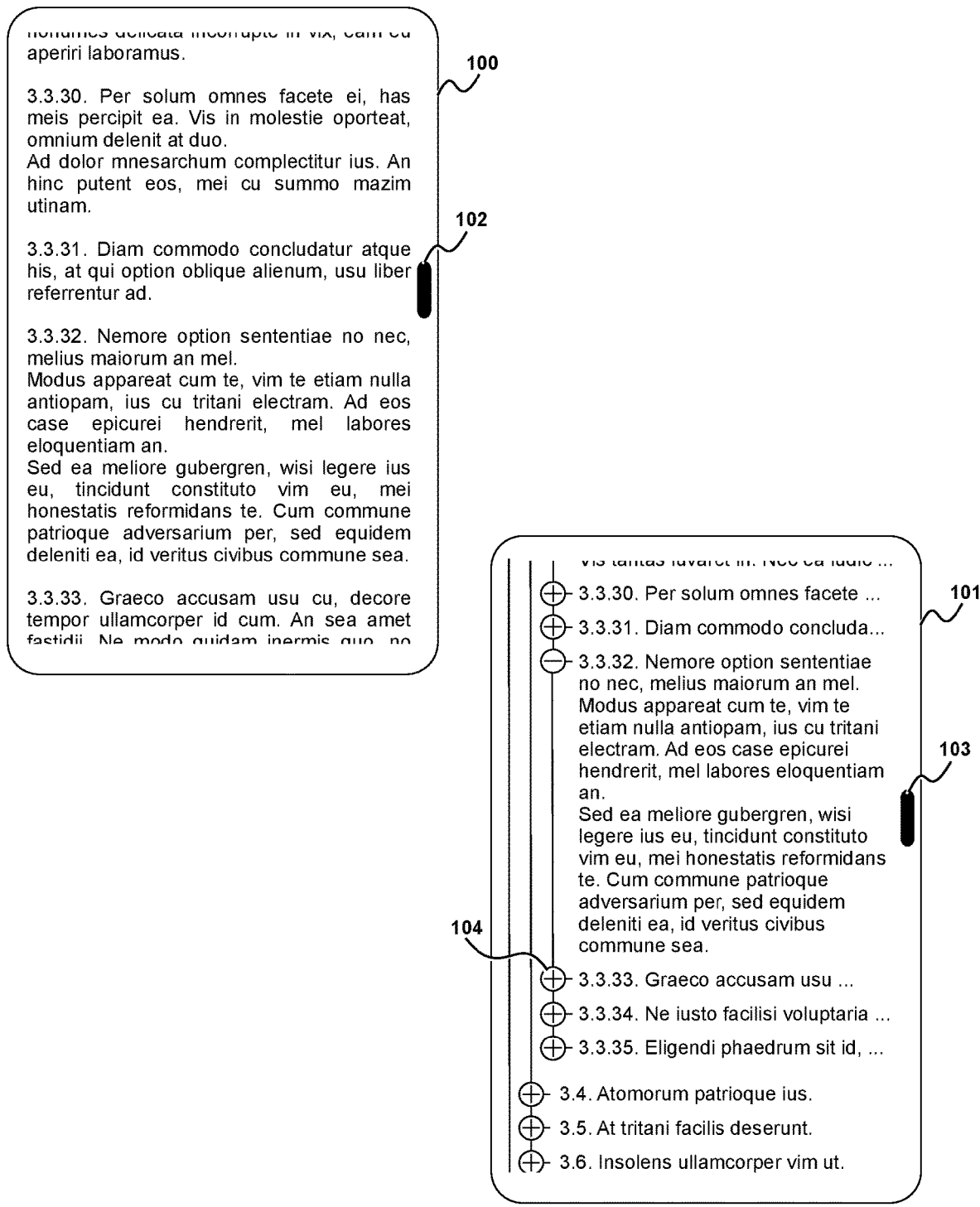
Fig. 1-A

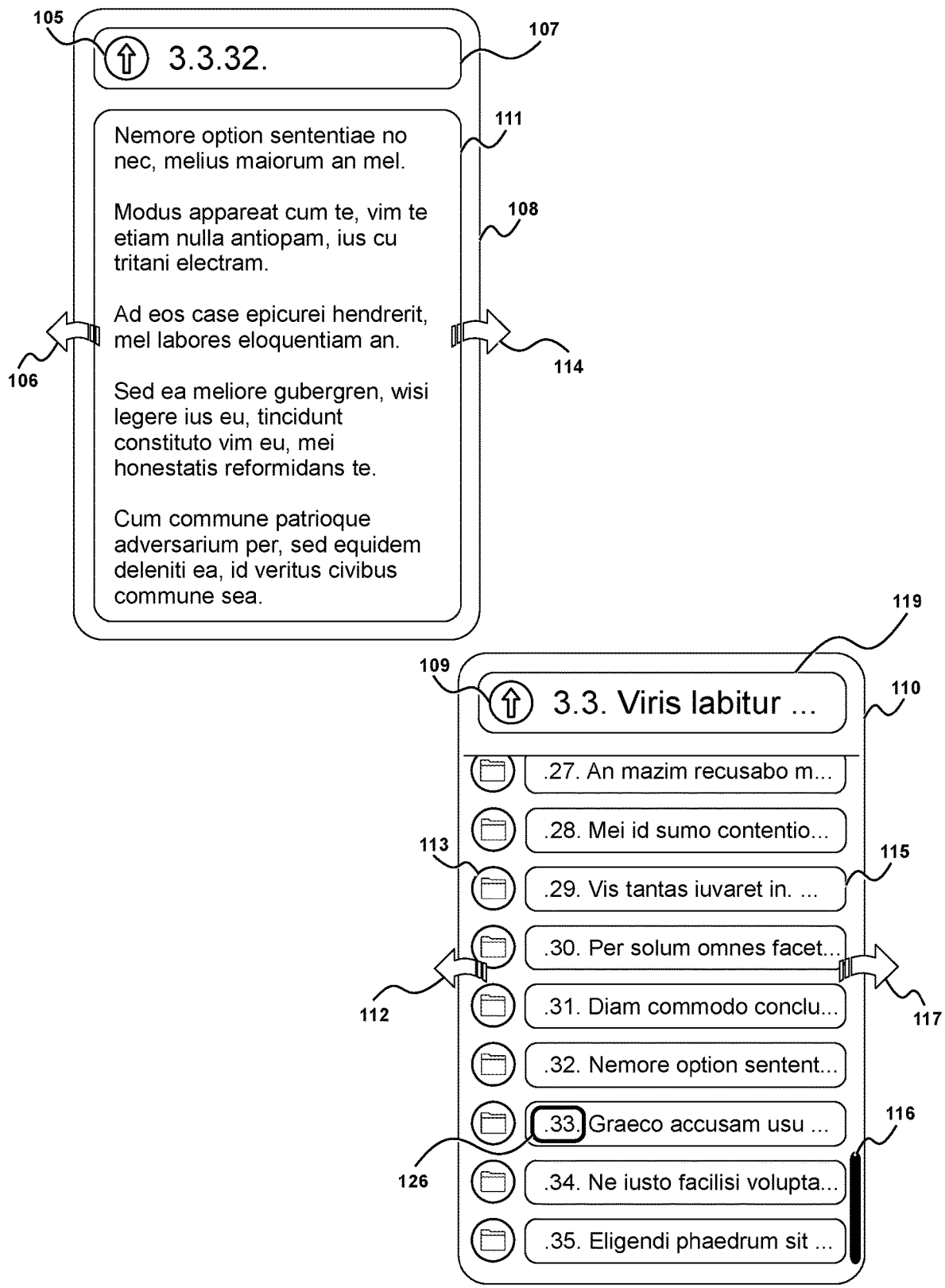
Fig. 1-B

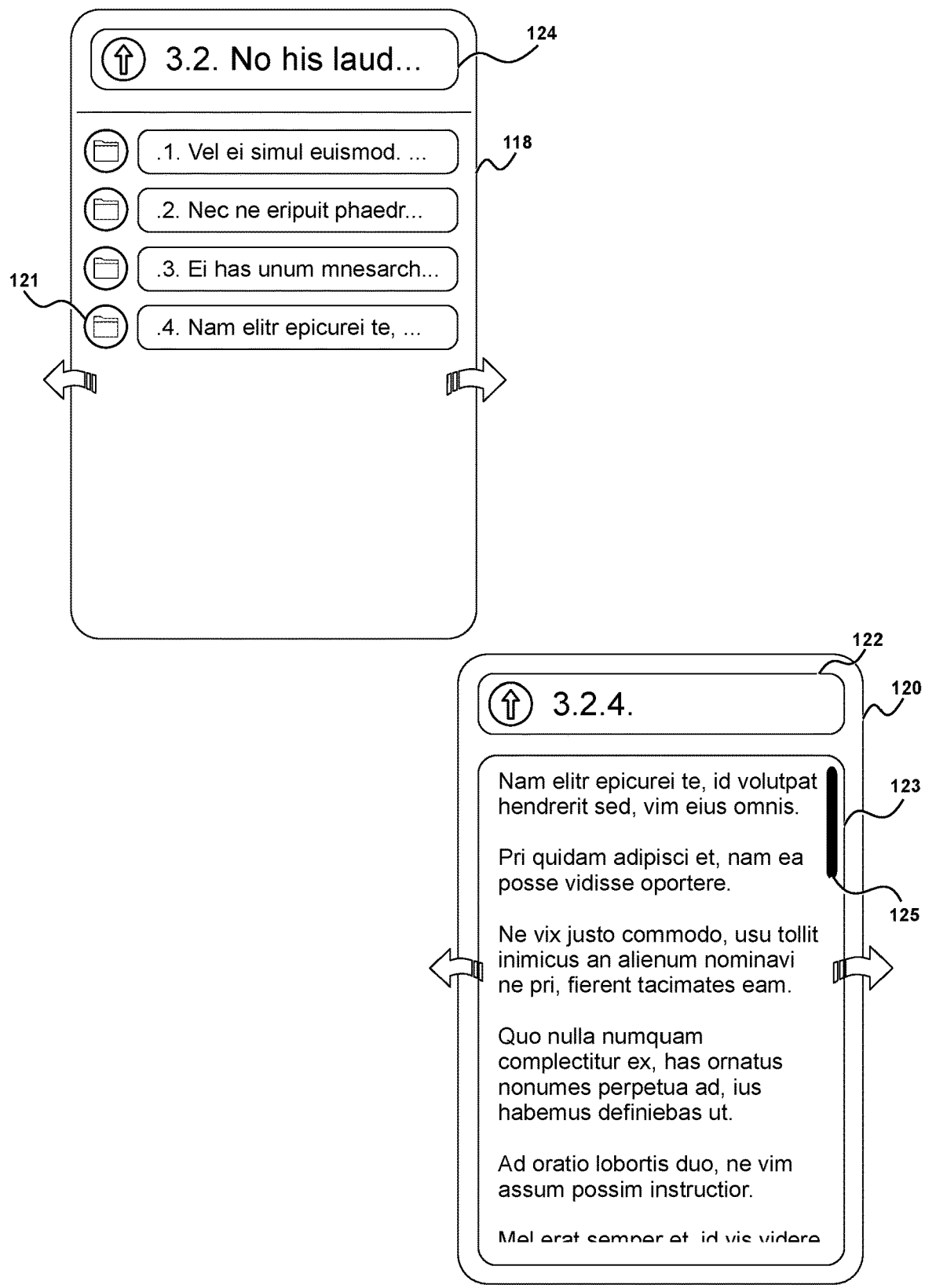
Fig. 1-C

LEASE AGREEMENT
TABLE OF CONTENTS

DEFINITIONS AND INTERPRETATIONS ................................................................................................ 1
TERMS AND CONDITIONS OF THE AGREEMENT ............................................................................. 1
1. Parties .......................................................................................................................................................... 2
2. Duration ....................................................................................................................................................... 2
3. Right of Use ................................................................................................................................................. 2
4. Rent .............................................................................................................................................................. 2
5. Maintenance and Repairs ............................................................................................................................ 3
GENERAL ....................................................................................................................................................... 3
I. Alterations and Improvements. ................................................................................................................... 3
II. Termination and Breach ............................................................................................................................. 3

DEFINITIONS AND INTERPRETATIONS

A) Building/s: the house and outbuildings, if any, on the Property.
B) Days: business days which are calculated by excluding: i) the first day, ii) public holiday, iii) Saturday, and iv) Sunday.
C) Lease Period: the duration of this agreement per clause 3

TERMS AND CONDITIONS OF THE AGREEMENT

The Lessor leases his Property to the Lessee on the terms and conditions of this agreement.
1. Parties. The Parties to this agreement are: a) John Doe ("Lessor"); and b) Joan Boe ("Lessee").
2. Duration. This agreement will commence on Sep. 1, 2017 and will continue for 2 year/s and 3 months.
3. Right of Use. The Lessee, for the Lease Period, has the right to use and enjoy the Property as agreed.
4. Rent
  4.1. Amount. The Rent will be: $ 800 for each Month of the first Year of the Lease Period.
  4.2. Yearly Increase. The amount shall increase, annually, by 2.5 %.
  4.3. Due Date. The Lessee must pay the Rent in advance, on or before the first day of each Month.
5. Maintenance and Repairs
  5.1. The Lessee must at his expense, and without recourse to the Lessor:
    5.1.1. maintain the Property subject to clause 5.3;
    5.1.2. repair damage to the Property regardless of the cause of such damage; and
    5.1.3. take care of the garden, if any, on the Property through watering, cutting, trimming, mowing, pruning, fertilizing substances necessary for the maintenance of the garden.
  5.2. The Lessee must notify the Lessor in writing within 30 Days after having taken possession of the Property that specific items need to be repaired or replaced. The Lessee must repair or replace the defective item/s at his own expense, without recourse from the Lessor.
  5.3. The Lessor is responsible for the i) maintenance, ii) repair, and iii) replacement of the roof and walls of the Building/s; including the structure, systems, and installations of the Building/s.

GENERAL

I. Alterations and Improvements. The Lessee may not make alterations or improvements to the Property without the Lessor's prior written consent.
II. Termination and Breach.
  II.1 If the Property is destroyed or damaged to the extent that it cannot be occupied, this agreement will terminate unless the Parties agree in writing otherwise.
  II.2 The insolvency of either the Lessor or the Lessee will not terminate this agreement.

Fig. 2-A

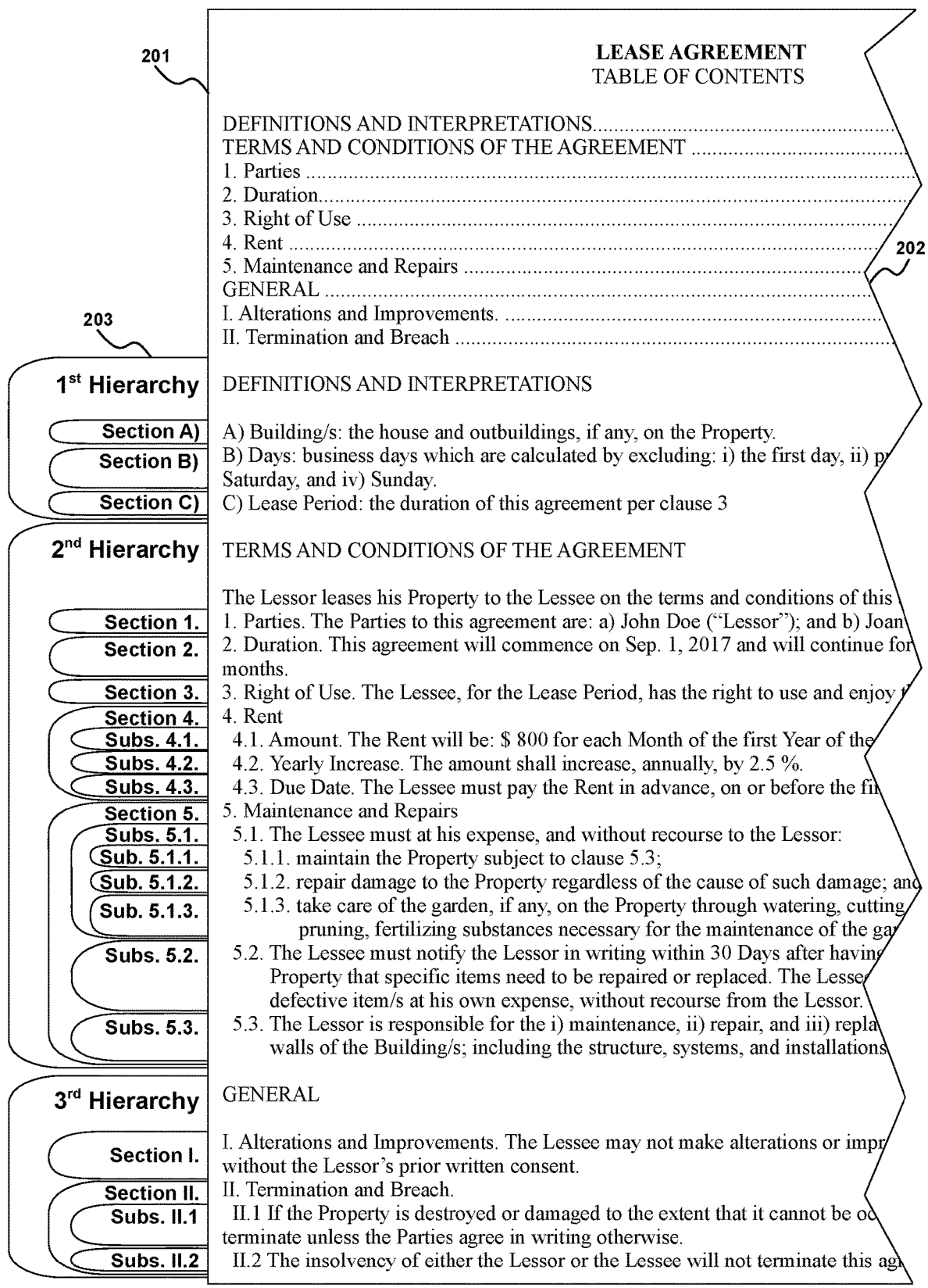
Fig. 2-B

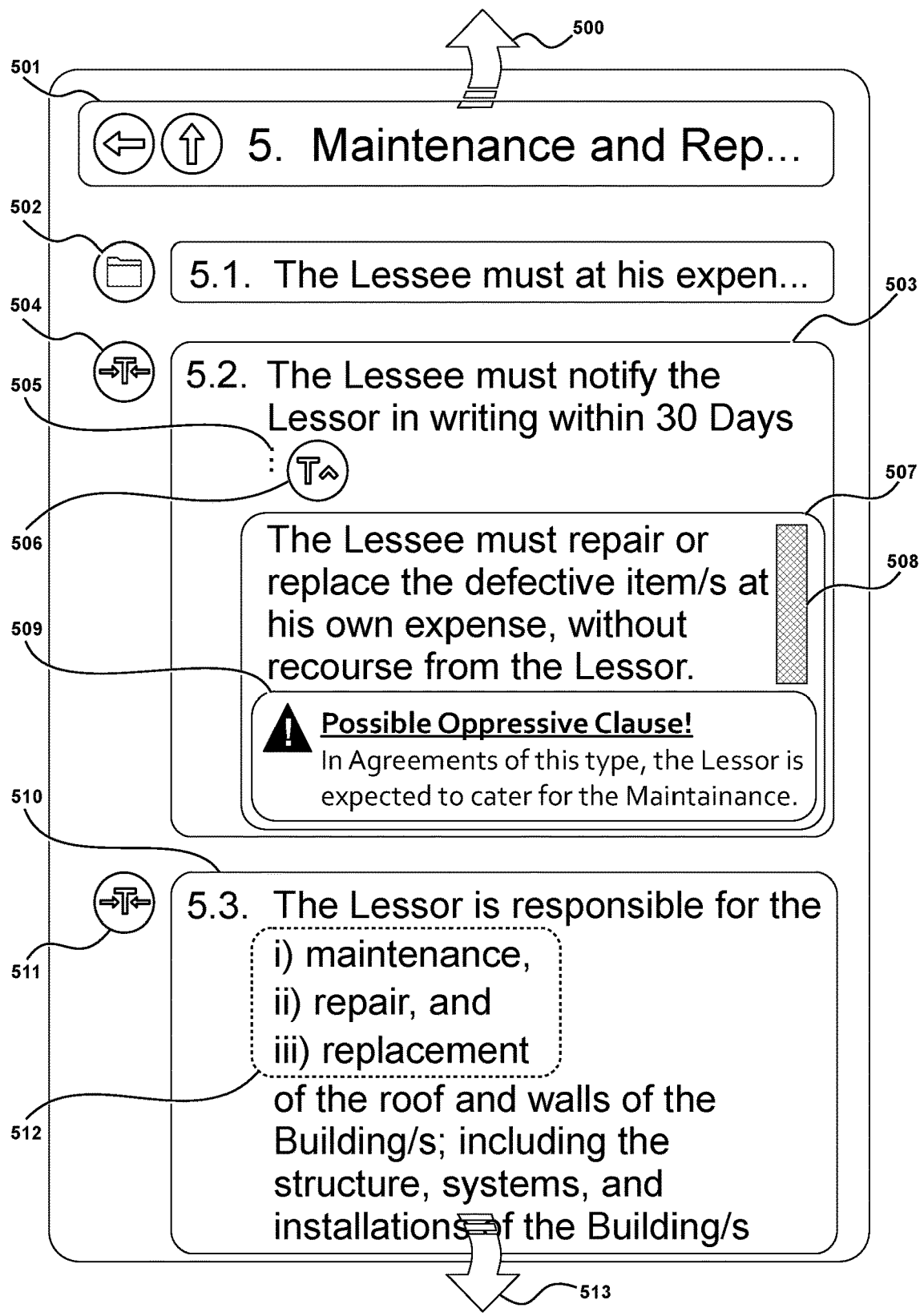
Fig. 5-A

5. Mainte... English (United States)  
Español (España)

5.1. The Lessee must at his expen...

5.2. The Lessee must notify the Lessor in writing within 30 Days

The Lessee must repair or replace the defective item/s at his own expense, without recourse from the Lessor.

⚠ Possible Oppressive Clause!
In Agreements of this type, the Lessor is expected to cater for the Maintainance.

5.3. The Lessor is responsible for the
i) maintenance,
ii) repair, and
iii) replacement
of the roof and walls of the Building/s; including the structure, systems, and installations of the Building/s

Fig. 5-B

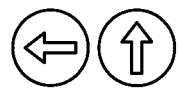 5. Mantenimiento y Rep...

 5.1. El Arrendatario debe a sus exp...

 5.2. El Arrendatario debe notificar al Arrendador ... dentro 30 Días ...

El Arrendatario debe reparar o reemplazar el/los artículo/s defectuoso/s por su propia cuenta, sin el recurso del Arrendador.

 Posible Cláusula Vejatoria!
En acuerdos de este tipo, el Arrendador se ocupa de los gastos de Reparación.

 5.3. El Arrendador es responsable del
i) mantenimiento,
ii) reparación, y
iii) reemplazo
del techo y las paredes del Edificio/s; incluyendo la estructura, los sistemas y las instalaciones del Edificio/s

Fig. 5-C

 4. Rent
516
4.1. Amount.
The Rent will be: $ 800 for each Month of the first Year of the Lease Period;
4.2. Yearly Increase.
The amount shall increase, annually, by 2.5 %.
4.3. Due Date.
The Lessee must pay the Rent in advance, on or before the first day of each Month.
Fig. 5-D

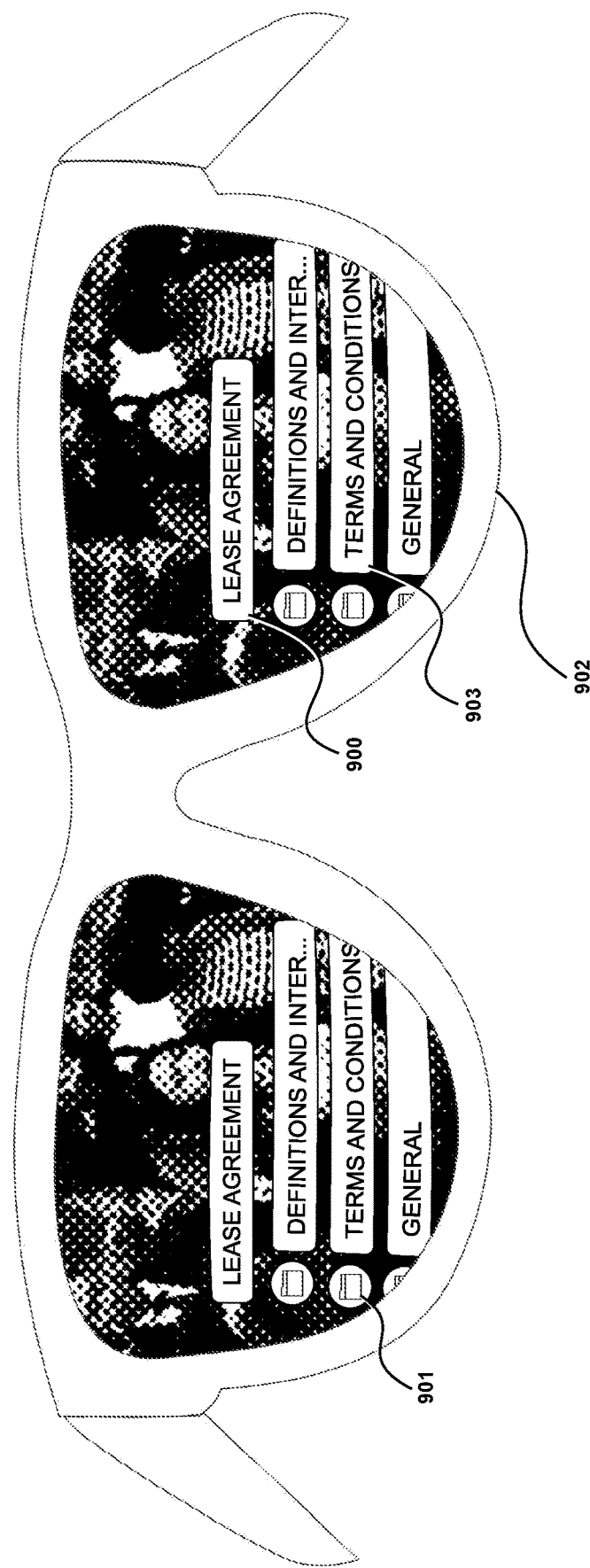
Fig. 9-A

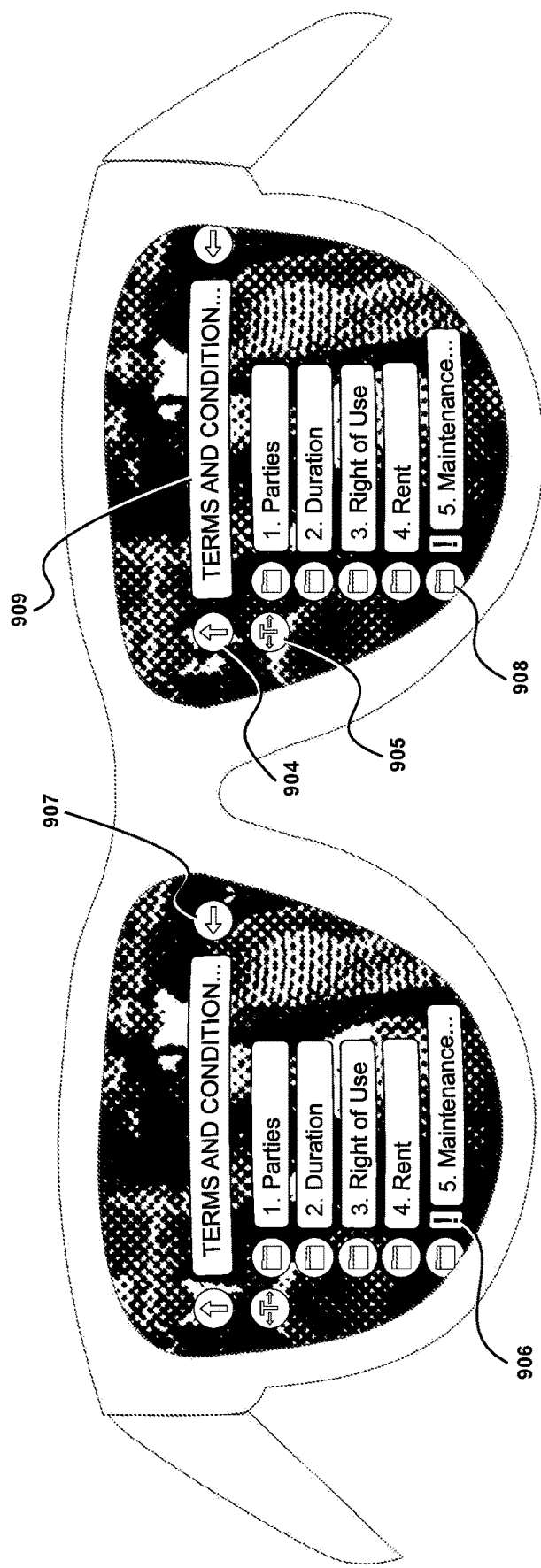
Fig. 9-B

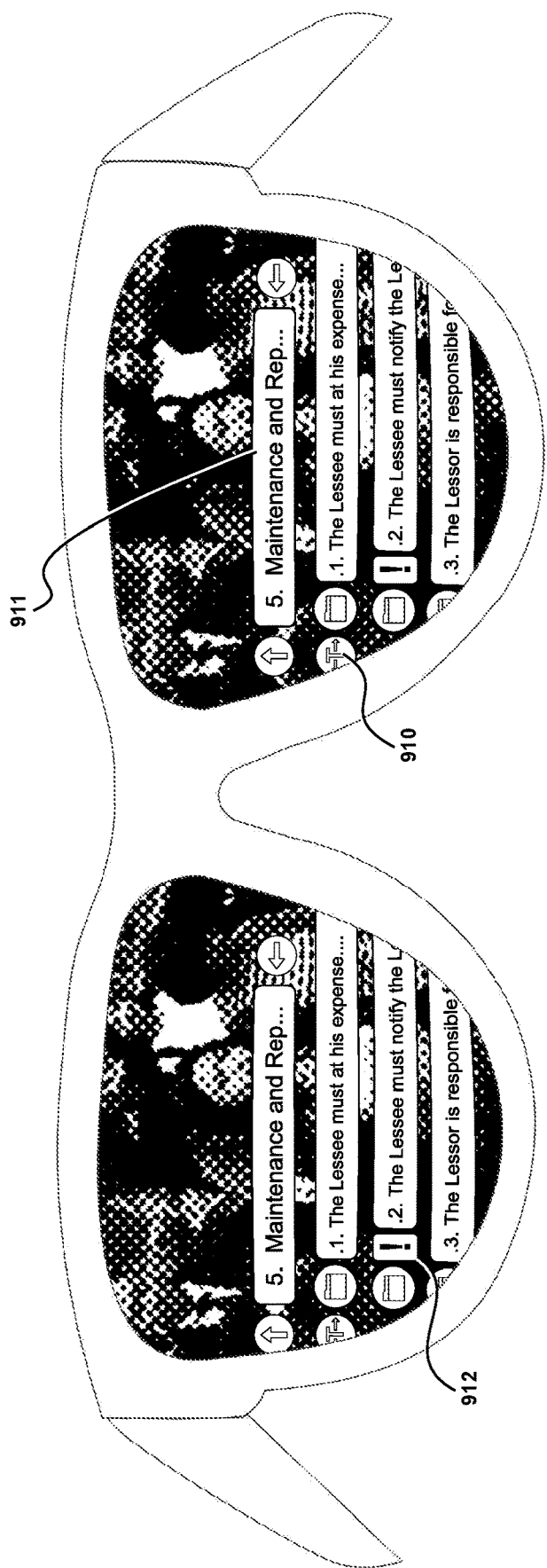
Fig. 9-C

DEVICE, SYSTEM AND METHOD FOR DISPLAYING SECTIONED DOCUMENTS

CROSS-REFERENCE TO RELATED APPLICATIONS

This application is a non-provisional of and claims benefit from U.S. Prov. App. Ser. No. 62/682,753, filed Jun. 8, 2018, entitled "DEVICE, SYSTEM AND METHOD FOR DISPLAYING SECTIONED DOCUMENTS," which is incorporated herein by reference in its entirety.

This application is related to U.S. application Ser. No. 16/152,384, entitled "METHOD, DEVICE, AND SYSTEM, FOR IDENTIFYING DATA ELEMENTS IN DATA STRUCTURES," filed Oct. 4, 2018 by the same inventor, which claimed priority to U.S. Prov. App. Ser. No. 62/573,174, filed Oct. 17, 2017, entitled "DEVICE, SYSTEM, AND METHOD FOR IDENTIFYING SECTIONS AND NUMBERED LISTS IN DOCUMENTS," each of which is incorporated herein by reference in their entirety.

FIELD

Aspects of the disclosure relate to a system or computer application for displaying documents, and in particular, to a system or computer application for displaying documents structured in sections.

BACKGROUND

It has become common in present times to exchange documents, especially contracts, in digital form and view them in electronic mediums. Commonly, most such documents are long and difficult to be visualized and satisfactorily comprehended, both to skilled and unskilled readers. Some of the reasons for these difficulties in visualization and comprehension generally lie in the components/actors of the reading process, e.g.: (i) the portion of view area available to the viewing applications—e.g., the size of the medium screen—is inadequate to display and properly navigate the document; (ii) the layout of the document makes it difficult to read and comprehend all its steps; (iii) the reader does not possess a sufficient level of expertise to fully understand relevant passages of the documents (e.g., legal documents); and/or (iv) the relevant passages referred to in the previous point "iii" have a visibility—in the document—that is not in accordance with their relevance (for example, in legal documents passages with low visibility may be known as "small prints"). In some cases the documents are available only in plain text, in other cases as web pages, or as documents in doc or pdf format. Depending on the document format, simple techniques provide partial solutions to the difficulties in visualizing and navigating the documents, especially to the difficulties related to the size of the medium screen. For example, (a) an HTML document may be visualized by means of a browser, which may by default implement display techniques generally applied to visualize the web pages (including, for example, a zooming function and a word wrap technique to adjust the text to the width of the screen); or (b) a pdf document can be visualized in a device by means of certain viewing applications (generally in case of pdf documents the zooming function of the document may be available, whereas the adjusting to the width might not).

This situation leaves a need for improved document navigability. Some document analyzers work only for documents with a pre-existing table of contents. Others perform analysis merely based on formatting and style, and therefore only work with a limited number of documents, thus escaping wide adoption. Some are limited to left-to-right languages, particular formatted documents, or are limited to alphabetic languages, only.

Embodiments described herein may address these and other limitations.

BRIEF SUMMARY OF THE INVENTION

Some aspects described herein may include a method to display documents, which may include sectioned documents and/or legal documents, in a form which aids the reading and comprehension of said documents. Some aspects may combine (1) the automatic identifying of the structure of section hierarchies of a document acquired upon a user's request (such as through processes described by the inventor in U.S. application Ser. No. 16/152,384, the entirety of which is incorporated herein by reference) and (2) the visualization and navigation of the structure in a directory-like "level-by-level" form (hereinafter referred to as "directory-like form") through an interface provided to the user. An advantage of the automatic identifying of document structure with methods such as U.S. application Ser. No. 16/152,384 may include that the document structure can be automatically and universally identified in a document regardless of the language, culture, character sets, style and/or formatting of the document. An advantage of the visualization/navigation in a directory-like form, compared to the visualization/navigation of the related art, may include a higher level of navigability of the document due to (i) the capability to present to the user certain parts of the document in the form of previews, which may be helpful for reading and comprehension (e.g., when reading using devices with small displays, hereinafter referred to as "small-view devices"); and (ii) a greater capability to convey the attention of the user to specific sections/subsections that are displayed.

Some aspects may improve a user's ability to comprehend the documents by helping the reader to focus the attention (1) on the specific passage of the document that is displayed by visually separating each passage from each other, and (2) on the relevant passages and other areas such as the small prints of the document (which may be determined by a computing device to be relevant to the user, for example, by using statistical techniques). Some aspects may improve the comprehension of the documents by providing the user with information on the relevant passages (hereinafter "passage information") including, for example, (a) an explanation of said relevant passages in terms easy to understand also for non-specialist users, and/or (b) a summary of the reasons for which the passage is highlighted (e.g., because the passage does not match with a legal standard provision typical of that specific type or other types of documents). Some aspects may improve the comprehension of the documents for users who (a) do not have proficiency with the language(s) in which the document is written (hereinafter, "document language(s)"), and/or (b) do not know the document language(s). The approaches of (1) visualizing the document in the directory-like form, (2) conveying the reader's attention to relevant passages, and (3) providing the passage information, may be provided to the users in a different language, e.g., translated from the document language(s).

BRIEF DESCRIPTION OF THE DRAWINGS

Aspects, features, and advantages of embodiments of the present disclosure are described in greater detail below in reference to the appended drawings in which:

FIG. 1-A shows two example of visualizations of a first sample document for comparative purposes.

FIG. 1-B shows two example displays that may be generated in accordance with one or more illustrative aspects described herein.

FIG. 1-C shows two example displays that may be generated in accordance with one or more illustrative aspects described herein.

FIG. 2-A shows an example document that may be processed using one or more illustrative aspects described herein.

FIG. 2-B shows an example result of identifying hierarchies that may be used in accordance with one or more illustrative aspects described herein.

FIG. 5-A shows an example display that may be generated in accordance with one or more illustrative aspects described herein.

FIG. 5-B shows an example display that may be generated in accordance with one or more illustrative aspects described herein.

FIG. 5-C shows an example display that may be generated in accordance with one or more illustrative aspects described herein.

FIG. 5-D shows an example display that may be generated in accordance with one or more illustrative aspects described herein.

FIG. 9-A shows an example display that may be generated in accordance with one or more illustrative aspects described herein.

FIG. 9-B shows an example display that may be generated in accordance with one or more illustrative aspects described herein.

FIG. 9-C shows an example display that may be generated in accordance with one or more illustrative aspects described herein.

DETAILED DESCRIPTION OF THE INVENTION

Figure 3:
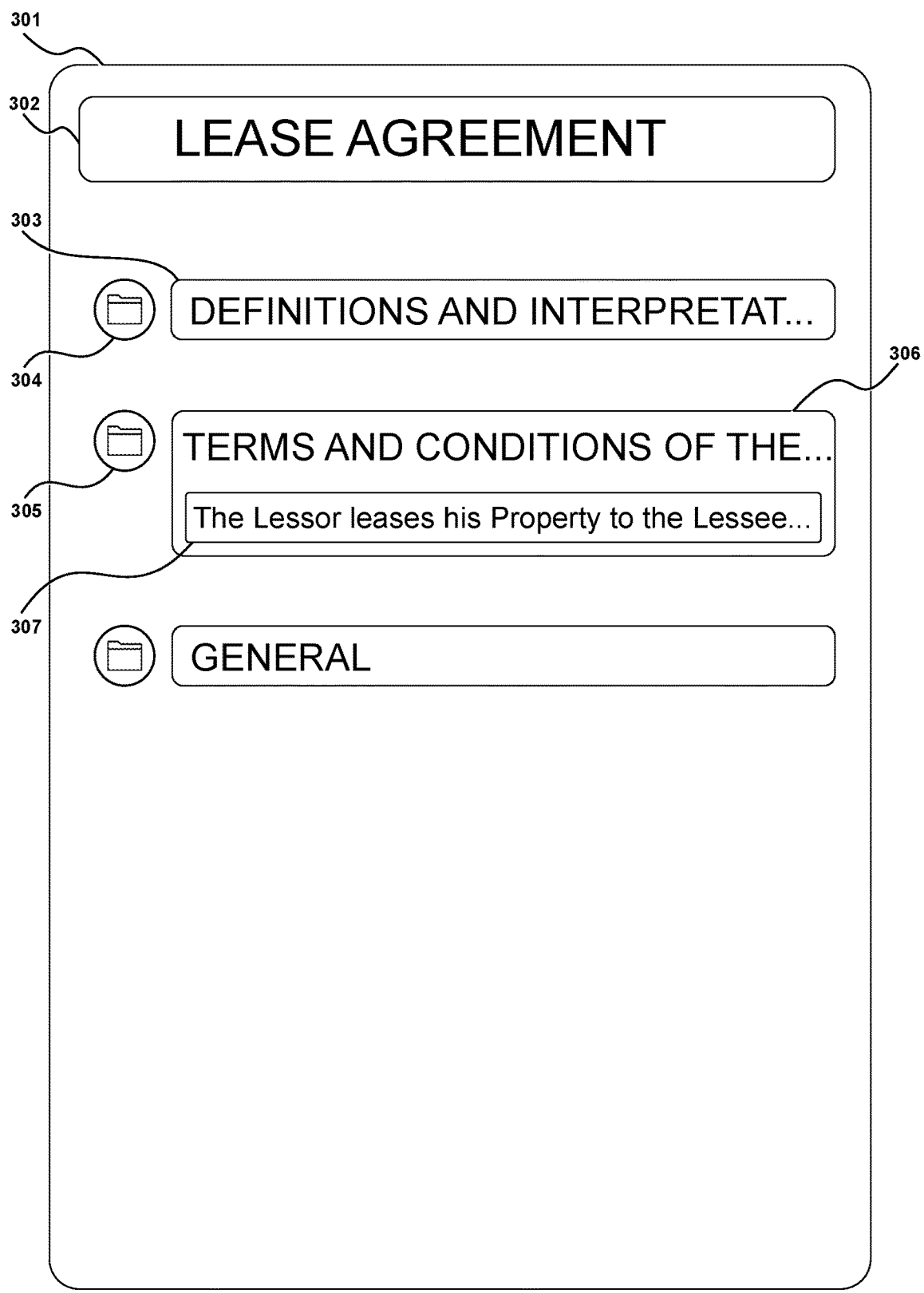
FIG. 3 shows an example display that may be generated in accordance with one or more illustrative aspects described herein.

In the following description, reference is made to the figures identified above, which illustrate various embodiments in which aspects described herein may be practiced. Other embodiments may be used. Structural and functional modifications may be made without departing from the scope described herein. Various aspects are capable of other embodiments and of being practiced or being carried out in different ways. The unconventional combination of features described herein may provide technical advantages over methods to date.

The following definitions provide context for the terms as used herein, and provide at least one definition thereof. In some instances and instantiations other definitions and other meanings are also possible. In other words, although at least one definition of certain terms is provided herein, some terms may be interpreted broadly or have multiple definitions.

"Section hierarchy" and "hierarchy" may mean an arranged set of at least one section of the input document. Each section of the at least one section may be (i) a sibling of the sections of the at least one section excluding itself (where the sections exist); and (ii-a) a childless element, or (ii-b) a root element of a tree data structure comprising at least one subsection of the input document.

"Document hierarchical entity" and "hierarchical entity" may mean (i) the input document, (ii) a hierarchy, (iii) a section, or (iv) a subsection.

"Hierarchy element" (of a hierarchy) may mean an element of a hierarchy and/or of a section and/or of a subsection of the hierarchy. Examples of hierarchy elements may include (i) a title of a hierarchy (e.g., "TERMS AND CONDITIONS OF THE AGREEMENT"), (ii) a header of a subsection (e.g. "4.1. Amount."), and/or (iii) a body of a section (e.g. "The Lessor leases his Property to the Lessee on the terms and conditions of this agreement.").

"Navigation move" may mean an action performed by a user, which may cause a computing device to change the display of a current hierarchical entity of a document to one or more further hierarchical entities of the document.

"Preview content" (of a hierarchy element) may include suggestive text obtained from the content text of the hierarchy element. The suggestive text may suggest a general idea of the content of the hierarchy element to a human reader. "Preview content" may include the case where a preview content is equal to the content text of the hierarchy element. An example of preview content of the text "Both the Parties agree to work together on different aspects of the procedures, including simplification of said procedures, and to further enhance the credibility of the market mechanism as a tool to reduce the distances between the two countries." may be "Both the Parties agree to work together on different aspects . . . as a tool to reduce the distances between the two countries."

"Relevant passage" may mean one or more sentence(s) that a user may need to read to fully understand the document. In the case of legal documents, relevant passage may include text that has legal repercussions, e.g. in case of acceptance of legal terms & conditions. In the case of legal documents, if the relevance of the passage is not in accordance with (e.g., less than) its visibility in the document (as explained in point (iv) of Par. 4) it may be defined as "small print".

Aspects described herein may ease the reading of documents, especially legal documents, by automatically identifying (1) section and/or subsection hierarchy(ies), (2) section(s), (3) subsection(s), and/or (4) numbered list(s) in such documents, and using the identified document components to build a framework to be used for document interaction. Aspects of the disclosure may provide a computer application that aides the reader of a document, such as a contract, in reading one or more documents without having to adhere to structural formalities within texts.

A user interface implemented on a computing device may offer the reader a set of functionalities including displaying each section and subsection of the input document in a collapsed form. A collapsed display of each section and subsection may be switchable to an expanded form as controlled by the reader. In the collapsed form, the sequential marker and the heading of each section, and/or an abbreviated format, may be shown. In the expanded form, the body (e.g., the text within a section) and the related subsections, e.g., in a hierarchical relationship and/or legalistic form, may also be displayed.

The user interface may alternatively or further allow the reader to navigate the internal reference(s) to the sequential marker by rendering them as links. The user may perform an action on a link to cause the computing device to display the referenced section or subsection of the document.

The user interface may alternatively or further ease reading of numbered lists, for example by displaying the list below "according to the conditions a) condition one, b) condition two, and c) condition three", e.g., in the following extended form:

"according to the conditions
   a) condition one,
   b) condition two, and
   c) condition three".

In an implementation, some of the functionalities of a computer application may allow a user of the application to provide, as input document, (1) a text string that the user can, for example, (1a) type in an appropriate entry field of the application, and/or (1b) copy and then paste from a source in the user's local computer; and/or (2) an input file selected from a list of candidate files.

Aspects described herein may be, in whole or in part, implemented in a web service. For example, the functionalities of the web service may allow a consumer of the service to upload to a server an input document and then to receive a set of data available to be displayed in a web interface that is implemented in a web application.

In a file-processing web-service implementation, some of the functionalities of the web service may allow a consumer of the service to upload an input document to a server and then to receive from the server a new version of the input document that includes a table of contents. The file-processing implementation may allow the reader to be free to use or not use a computer application each time that the reader needs to consult the document, because the new version of the document may be in a format that is accessible by many different types of applications (e.g., .PDF, .RTF, .DOCX, etc.). The internal references in the table of contents may be available as (a) links to the section (e.g., when the document is displayed in a digital device); and/or (b) page numbers, when the document is printed, for example.

The user interface may display a split-screen, where the table of contents in displayed in one portion of the user interface and the body of the document is displayed in a different portion of the user interface.

In an address-processing implementation, some of the functionalities of a web service may allow a consumer of the web service to transmit to a server the web address of an input document—which may be, for example, in the form of an HTML web page—and then to receive a set of data available to be displayed in a user interface (e.g., a web interface that is implemented in a web application).

In a document-selection implementation, some of the functionalities of a web service may allow a consumer of the web service to select an input document, for example, from a list of input documents, and then receive a set of data—in whole or in part related to the selected input document—which may be displayed in a user interface (e.g., a web interface that is implemented in a web application).

Aspects described may be, in whole or in part, implemented in an extension, an add-on, a plug-in, and/or another component installed in third-party applications—for example, in viewing applications (e.g., PDF viewers) and/or in editing applications (e.g., word processors). For example, the user of a word processor program may utilize the functionalities of a program add-on implementing the herein described methods to facilitate the navigation of the document while editing the same document. In a further example, the user of a PDF viewer application may utilize an application extension implementing embodiments of the invention to facilitate the reading of a document while using a PDF viewer application.

In certain embodiments, a reader of a document, for example a contract, may be benefitted by a computer application which may ease the reading, the comprehension, and the focusing on portions of the document. Examples of categories of documents that can be used in aspects described herein include (1) a hard copy of a document, (2) a text-based file—e.g., a computer-readable file in which the content of the document is stored as text—, (3) a digital document (e.g., a document that is shown as part of the installation process of an Application), and/or (4) an on-line document.

The computer application, after acquiring a document upon a user's request, may present to the user the content of the document in a directory-like form of a navigable user interface (hereinafter referred to as "Smart View Interface" and "SVI"). One advantage of the SVI, may be that it visualizes the text of the document in a linear format—e.g., by rendering the text of the document in a logic flow (with or without flow branches) from the top to the bottom of a display. Furthermore, the SVI may display the text of one or more portions of the document at a time, allowing the user to fully focus on a portion of interest with much greater ease than visualizing the original document. A further advantage of the SVI is that it may allow the user to keep an eye on a title and/or subtitle of the portion of the document while (1) viewing, and/or (2) scrolling through its content. Yet a further advantage of the SVI is that it may have a minimal learning curve.

Computer applications according to the invention may alternatively or further provide a double visualization of the document by displaying portions of the document in the SVI and portions of the document in its original layout at the same time. The benefits of the double visualization may include (1) assuring the users that the content displayed in the SVI is the same as the content in the input document, and (2) allowing a user to swiftly locate the information displayed in the SVI in a view containing the original-layout of the document. The double visualization may reduce the portion of screen available for the SVI. The SVI may provide a level-by-level navigation and may increase the readability of documents in small-view devices. The SVI may provide an advantage when double visualization is used because it may increase readability of the document, allowing the document to be read in the reduced portion of the screen.

The SVI may alternatively or further enhance the comprehension of the document by helping the user to focus attention on the portions of text by displaying text in a directory-like form. The SVI may use visualization techniques to attract the user's attention to passages that are determined by the computing device to be relevant to the user. For example, the SVI may display (1) a view of a relevant passage separated from other passages, (2) visual indicia to help the user recognize the relevant passages (e.g., a color band, an icon, highlighted text, etc.), and/or (3) information related to the relevant passage. The SVI may display the visual indicia and/or information related to the relevant passage in a view of the ancestor hierarchical entities that include the passages (e.g., a parent section, parent directory, etc.). These visualization techniques may orient the user to more easily discover passages that the computing device has determined to be relevant to the user. Additionally/alternatively, the user may be provided with a preview of text at the top and/or the bottom of the relevant passages. The preview may establish context of the relevant passages. The relevance of passages may be determined by the computing device on the basis of warning criteria.

Additionally/alternatively, the SVI may use visualization techniques to attract the user's attention to the omission of key passages that are generally included in standard documents. The omission of said key passages may be determined by the computing device on the basis of omission criteria.

The user interface may alternatively or further display passage information corresponding to passages that are determined to be relevant to a user. For example, passage information may include one or more textual explanations (e.g., notes, remarks, tips, and/or warnings) related to the relevant passages. The textual explanations may be automatically generated through text-generating techniques.

The techniques (i) to determine the relevance of passages, (ii) to determine the omission of key passages, and/or (iii) to generate the textual explanations may take as input data, for example: (1) the type(s) of document (e.g. Lease Agreement, Insurance Contract, Bilateral/Unilateral Contract, etc.), (2) the document language(s) (e.g. US English, Spanish, French, etc.), (3) the context in which the relevant passage is (e.g., text appearing before and after the relevant passage), (4) a set of keywords identified in the relevant passage, which may be conjugated and/or otherwise modified according to the grammar of the document language(s), and/or (5) statistics and/or other aggregated data that may be collected from the document and/or from other documents.

The computing device may alternatively or further provide, in a translation language, (1) view(s) of the document, and/or (2) passage information.

The computing device may display a document map—e.g., an overall view of the document structure in the form of a hierarchy tree—in addition to a directory-like view.

Aspects described herein may be implemented in a web service. For example, the functionalities of the web service may allow a consumer of the service to upload to a server an input document and then to receive from the server a set of data available to be displayed in a SVI which can be implemented, for example, in a web application.

Aspects described herein may be, in whole or in part, implemented in an extension, an add-on, a plug-in, and/or a component installed in third-party document applications—for example, in viewing applications (e.g., PDF viewers) and/or in editing applications (e.g., word processor applications such as Microsoft® Word). For example, the user of a word processor application may utilize a program add-on—which may implement a number of functionalities of the aspects described herein (e.g., while editing a document).

In a further example, the user of an application may utilize an extension installed in the application—the extension may implement a number of functionalities described herein—e.g., to have some aspects of a pdf document displayed and/or explained.

A number of practical examples of implementations are described in the examples herein. Although numerous variations of the user interface and other aspects are possible, the following general assumptions are made for the examples described herein solely for elucidative purposes and not to limit the scope of the claims. For the implementations described herein, no restriction is implied on whether the steps of the method are implemented in a web service, in a computer application, or in a component of a third-party document application, although certain steps are described as implemented in either the computer application or the web service for reasons of brevity.

The advantages of utilizing a SVI for the navigation/visualization of a first sample document (described below) are shown over two comparative usage examples, namely (i) the navigation of the document in its original layout, and (ii) the navigation of a tree structure view of the document. The goals of the user in aspects described herein may include (1) consulting a subsection of a document, such as the subsection "3.3.32" of the first sample document, and/or (2) consulting a subsection such as the subsection "3.2.4.", which is the last child subsection of subsection "3.2." in the first sample document In one example, the original layout navigation of the first sample document is shown in the screen 100 of a touch screen device (depicted in FIG. 1-A). The document may be rendered in the screen 100 with its width adjusted to the screen width by means of a word wrap technique. The user may move to different parts of the document through the control of the scroll bar 102. In this usage example, the user may perform an action on the scroll bar to scroll the document through the 31 subsections at the top of "3.3.32." until the computing device displays the subsection "3.2.4." (not depicted for brevity).

An additional example view is shown in the display 101. In this usage example, the first sample document is displayed in a tree structure view, with a collapsing/expanding technique of the sections/subsections. In display 101, the user may expand and/or collapse each section and subsection of an input document by performing an action to the switch 104. The user may visualize parts of the document not displayed in the display 101 by using the scroll bar 103. The user may perform (i) an action on the scroll bar 103 to scroll past the 31 subsection nodes that are above the node "3.3.32." until the user reaches the node of the subsection "3.2.4." (not depicted for brevity). The user may take (ii) an action to a switch associated with the subsection "3.2.4." that may cause the content of subsection "3.2.4." to be displayed. One potential advantage of this view is that the actions of scrolling up the view and searching for the target subsection "3.2.4" may be easier and/or faster for the user because the 31 subsections nodes to be scrolled may be initially in a collapsed status.

Users may desire to locally navigate the document, e.g., to change the view from a currently-viewed part of the document to another part of the document. For example, a user may need to change from the view of the currently-viewed section to (1) the view of a section immediately subsequent to the currently-viewed section, and/or (2) the view of a section visualized immediately prior to the currently-viewed one. The displaying of a limited number of commands and controls that allow the user to locally navigate the document may be handier and less confusing for the user, especially, e.g., with documents with a complex and/or deeply nested structure.

The analysis of the local navigation may be statistically based on lists of most frequent navigation moves of the readers (a) of the document that is being displayed and/or (b) of other documents. Some navigation moves performed by a user may be referred to as neighboring moves and may include: (1) "NEXT", which may cause display of a section/subsection immediately subsequent to the currently displayed section; (2) "EXPAND" which may cause display of children section(s)/subsection(s) of the currently displayed section; (3) "PREVIOUS", which may cause display of a section/subsection immediately preceding the currently displayed section; and (4) "UP", may cause display of a parent section/subsection of the currently displayed section.

Additional navigation moves may be referred to as history moves and may include: (1) "BACK", which may cause display of the section/subsection that was displayed immediately prior to the current display; and (2) "FORWARD", which may cause display of the section/subsection that was displayed immediately before a move "BACK" was performed.

In some aspects, a SVI may be displayed by a computing device to a user. The SVI may be implemented in a computer application. For example, the SVI may include navigation controls that allow the user to perform the neighboring moves, as depicted in FIGS. 1-B and 1-C. In the displays 108, 110, 118 and 120 of FIGS. 1-B and 1-C, the controls for the neighboring moves "NEXT" and "PREVIOUS" may be performed using touch gestures. For example, a user may perform the neighboring moves by swiping the screen with a finger. A left swipe on the screen (depicted with the arrow 106) by a user may result in a "PREVIOUS" neighboring move, whereas the action of swiping right (depicted with the arrow 114 and the like) may result in a "NEXT" neighboring move. Furthermore, the control for the "UP" neighboring move may be depicted with the button 105, and the control for the "EXPAND" neighboring move may be depicted with the button 113.

Referring to FIG. 1-B, a user may perform a number of navigation actions to change the view from the subsection "3.3.32." to the subsection "3.2.4." of the first sample document by using the SVI. The initial view of the subsection "3.3.32." is visualized in the display 108. In this view, a number of controls are presented to the user in order to locally navigate the document through simple actions, e.g., he/she can view (1) the previous subsection "3.3.31." by swiping the screen to the left (depicted with arrow 106), (2) the subsequent subsection "3.3.33." by swiping the screen to the right (depicted with arrow 114), and (3) the parent subsection "3.3." by touching the button 105.

In the display 110, a visualization of the subsection "3.3." is depicted. In display 110 a number of children panels (e.g., panel 115) are displayed. Each child panel may (1) contain preview content of a child subsection of the subsection "3.3.", and (2) may include a button (e.g., a button similar to button 113). In the preview content of each child subsection in display 110, the last consecutive number (e.g., the number 126 of FIG. 1-B) of the subsection identifier may be shown, for example, to omit redundant information and increase the portion of display available for the headings of the children subsections. Button 113 (and/or other similar buttons) may, upon selection by a user, cause the computing device to perform the "EXPAND" neighboring move. The view of the subsection "3.3.29." may be displayed, for example, in response to an action performed by the user on button 113. Furthermore, the user may scroll the display to view the children panels of the subsections from "3.3.1." to "3.3.35" through the scroll bar control 116. The user may perform a right swipe action (depicted with the arrow 117) on the display, which may result in a "NEXT" neighboring move. The user may perform a left swipe action (depicted with the arrow 112) on the display, which may result in a "PREVIOUS" neighboring move.

As shown in display 110, the computing device may display the previous subsection "3.2." after receiving a left swipe from a user. The computing device may display the next subsection "3.4." after receiving a right swipe from a user. The computing device may display the parent section "3." after the user selects (e.g., by touching) the button 109. The computing device may display the children subsections of the subsection "3.3." after the user selects (e.g., by touching) an interface element associated with the children subsections such as button 113. For example, after receiving selection of button 113, the computing device may display text associated with section 3.3.29.

In FIG. 1-C, the views of the subsections "3.2." and "3.2.4." are depicted in the displays 118 and 120, respectively. To cause display of the subsection "3.2.4." starting from the view of the subsection "3.3.32." (as shown in display 108 in FIG. 1-B), the user may perform the following actions: (i) the user may touch the button 105 to cause display of the subsection "3.3." (as shown in display 110), then (ii) the user may swipe the screen to the left (depicted by the arrow 112 in FIG. 1-B) to cause display of the subsection "3.2." (as shown in display 118 in FIG. 1-C), and (iii) the user may touch the button 121 to cause display of subsection "3.2.4." (as shown in display 120 of FIG. 1-C).

It is noted that the navigation from the subsection "3.3.32." to the subsection "3.2.4." with the SVI may be easier for the user, since the step of scrolling up the subsections in search of the subsection "3.2.4."—which may be inconvenient to the user—may be bypassed. Furthermore, the readability of the body of the subsections "3.3.32." and "3.2.4." (depicted in the screens 108 and 120) may be improved because in the SVI (1) each passage of the text of the subsection bodies is visually separated from the other, and (2) additional screen space may be available to the body (111 of FIG. 1-B and 123 of FIG. 1-C). Generally, the readability of the sections/subsections with no children subsections (hereinafter "leaf sections/subsections") is particularly improved with the SVI, due to the increased screen space available to the body. Another readability improvement may be that the header area—in which the subsection headers 107, 119, 124 and 122 are displayed—may be clearly separated from the area occupied by the bodies and by the leaf subsections, because additional screen space may be available to the bodies and to the leaf subsections in the SVI (hereinafter the bodies and the leaf subsections are referred to as "non-header elements"). A potential advantage of said separation of the headers from the non-header elements may include, for example, that the user may view at the same time (1) a portion of a non-header element, and (2) the header, while the user may scroll up and down the non-header elements through scroll bar controls such as 116 and 125. A further readability advantage of the SVI, may be that the display of the leaf sections/subsections may be distinct from the display of other parts of the document—such as the portions of the document in display 120—, and thus the user may more easily pay attention to the leaf sections/subsections.

In some aspects, a web application may be provided to a user. Sections of a document may be identified by a web-server. The SVI may be a web application and/or interface (e.g., user interface) that is provided by the web-server. The SVI may provide a number of functions among which may include, for example, a set of functions aimed to have a document sent to the web-server by the web application.

A user may access the SVI from a browser program running in a computing device. Examples of document source options may include: (a) uploading a document, (e.g., a local file) to the web-server; (b) sending a URL of a document available on the Internet to the web-server; (c) selecting a document from a third-party repository and/or application and then sending the selection to the web-server; (d) scanning a document from an optical device and then sending the scanned document to the web-server; (e) pasting the content of a document in a form field and then sending to the web-server; and/or (f) picking a document from a selection of documents available on the Internet and/or pre-loaded in the web-server.

The user may select a document source option from a selection of document source options. After selecting the source option, the user may select a loading action congruent with the document source option selected. As a result of the loading action, a document may be uploaded to the web-server by a computing device and/or selected in the web-server. The document may be processed in the web-server to identify its section hierarchies (such as through use of one or more processes described by the inventor in U.S. application Ser. No. 16/152,384). Results of the document processing may be sent to the browser. The results may be contained in a JSON file that is sent to the browser. The SVI running in the browser may receive and/or process the JSON file. The SVI may display the section hierarchies of the document (e.g., in a directory-like form).

One or more hierarchical entities may be displayed to a user in directory-navigation view(s). A directory-navigation view may include a directory-like form. A directory-navigation view may include (a) a header panel at the top of the screen, and/or (b) one or more children panels beneath the header panel.

The header panel may show the user which hierarchical entity is displayed in the view, so that the user can more easily identify the hierarchical entity. The header panel may show a portion of text of (1) the title of the document, (e.g., this may occur when a root directory of the document is shown in the view); (2) the title of a hierarchy that is being displayed; and/or (3) the heading text of a section/subsection that is being displayed.

A number of navigation controls (e.g., navigation buttons) may be displayed in the header panel. For example, the navigation controls may allow the user to navigate across the hierarchies, the sections, and/or the subsections of the documents. The navigation controls may allow the user to perform the neighboring moves and/or the history moves.

If a displayed hierarchical entity has a body (e.g., text not included in the header and/or in the children subsections), the preview content of said body may be shown in (i) a body panel beneath the header panel, and/or (ii) a sub-panel of the header panel.

In some implementations, only the first level of sub-elements of a displayed hierarchical entity may be shown in a SVI. The children panels may be designed to provide the user information sufficient to understand the portion of text that a panel represents. The children panels may include all or a portion of text of (1) the title(s) of the hierarchy(s) of the document, (e.g., this may be displayed when a root directory of the document is shown in the view); (2) the header(s) of the section(s) of a hierarchy; and/or (3) the header(s) of the subsection(s) of a section/subsection.

Panels and/or sub-panels may be displayed with preview control(s), allowing a user to select the level of detail of the information given in the preview content(s) displayed in said panels and/or sub-panels. For example, preview content of a section's body may contain the text "Both the Parties agree to work together . . . ." A button at the left of this preview content may be utilized by the user to change the display to show the full content of the body, which may be "Both the Parties agree to work together on different aspects of the procedures, including simplification of said procedures." The button may additionally/alternatively be used to switch from the preview content to the full content.

If a relevant passage of a document is automatically detected—e.g., on the basis of a usage statistic on documents of the same type(s)—the display may include an indication of the presence of said passage. For example, an indication may include (1) a colored band in the panel containing the passage, and/or (2) a colored band in the panels of the ancestor panels of the hierarchy entity that contains the passage. A sub-panel showing the textual explanation(s) of the relevant passage may be displayed in a panel.

One or more warning criteria may be utilized to determine (1) whether a passage is relevant or not, and/or (2) a degree of relevance of the passage. The degree of relevance may be based on the other passages of the document. One or more weight-based warning criteria may be utilized to calculate, for example, the degree of relevance of a passage from the average of relative semantic weights of the words and/or word-groups of the passage. The relative semantic weight of a word and/or of a word-groups may be, for example, (i) equal to a pre-defined value, and/or (ii) calculated as a function of (ii-1) one or more document language(s), (ii-2) one or more document type(s), and/or (ii-3) the proximity to other words and/or word-groups. For example, the degree of relevance may be calculated as a floating point number which may be compared to a relevance threshold value in order to determine whether the corresponding passage is relevant or not. Additionally/alternatively, the degree of relevance may be mapped into one or more visual properties of visual indicia that may be displayed alongside the corresponding passage (e.g., the relevance of each passages may be proportional to the color intensity of a colored band positioned at the right of the passage).

The presence of relevant passages and/or the omission of key passages may be, for example, determined on the basis of notable differences between (1) the document—which may be detected to be of a certain document type(s) in a certain language(s)—, and (2) a number of standard documents of that document type(s) in that language(s). For example, a set of "do" clauses may be determined as (i) missing in the document, and/or (ii) partially included in the document without fully covering the breadth of the standard documents of that document type(s) by utilizing a set of pre-defined omission criteria. "Do" clauses may include clauses that are typically included in a given type of document. For example, a "do" clause for an insurance contract may include a clause relating to an annual premium because an annual premium may be typically included in an insurance contract. Additionally/alternatively "do" clauses may include permissive clauses. Additionally/alternatively, the presence in the document of a set of "don't" clauses (e.g., clauses that may be oppressive because, for example, they provide an unbalanced benefit to one of the parties), may be detected by utilizing a set of pre-defined warning criteria. For example, in the subsection "5.2" of a "Lease Agreement" document (depicted in FIG. 5-A) the cost for repairing and replacing defective items—which is generally borne by the lessor—is attributed to the lessee. The warning 509, displayed in a SVI, may draw the user's attention to presence of the non-standard clause in the subsection "5.2" of the document.

For example, a procedure for (i) identifying relevant passages, (ii) detecting the omission of key passages, and/or (iii) generating the textual explanations may include the following steps: (1) identifying the document language(s) and the document type(s) for the document; (2) detecting if one or more passages of the document match with at least a "don't" clause pattern of a set of pre-defined "don't" clause patterns related to one or more document type(s) and/or one or more document language(s); (3) detecting if one or more passages of the document match with at least a "do" clause pattern of a set of pre-defined "do" clause patterns related to one or more document type(s) and/or one or more document language(s); (4) if one or more passages verify the condition of point (2), displaying a visual indicia and/or a textual explanation related to that passage(s) and/or to the "don't" clause pattern(s) that match with the passage(s); and/or (5) if no passage of the document verifies the condition of point (3), displaying a visual indicia and/or a textual explanation related to the "do" clause pattern(s) that are not matched in the document.

The directory-navigation views may be, for example, displayed in a part of the screen, while in another part of the screen the document may be presented to the user in its original layout (hereinafter this view mode is referred to as "double-view mode").

Figure 7:
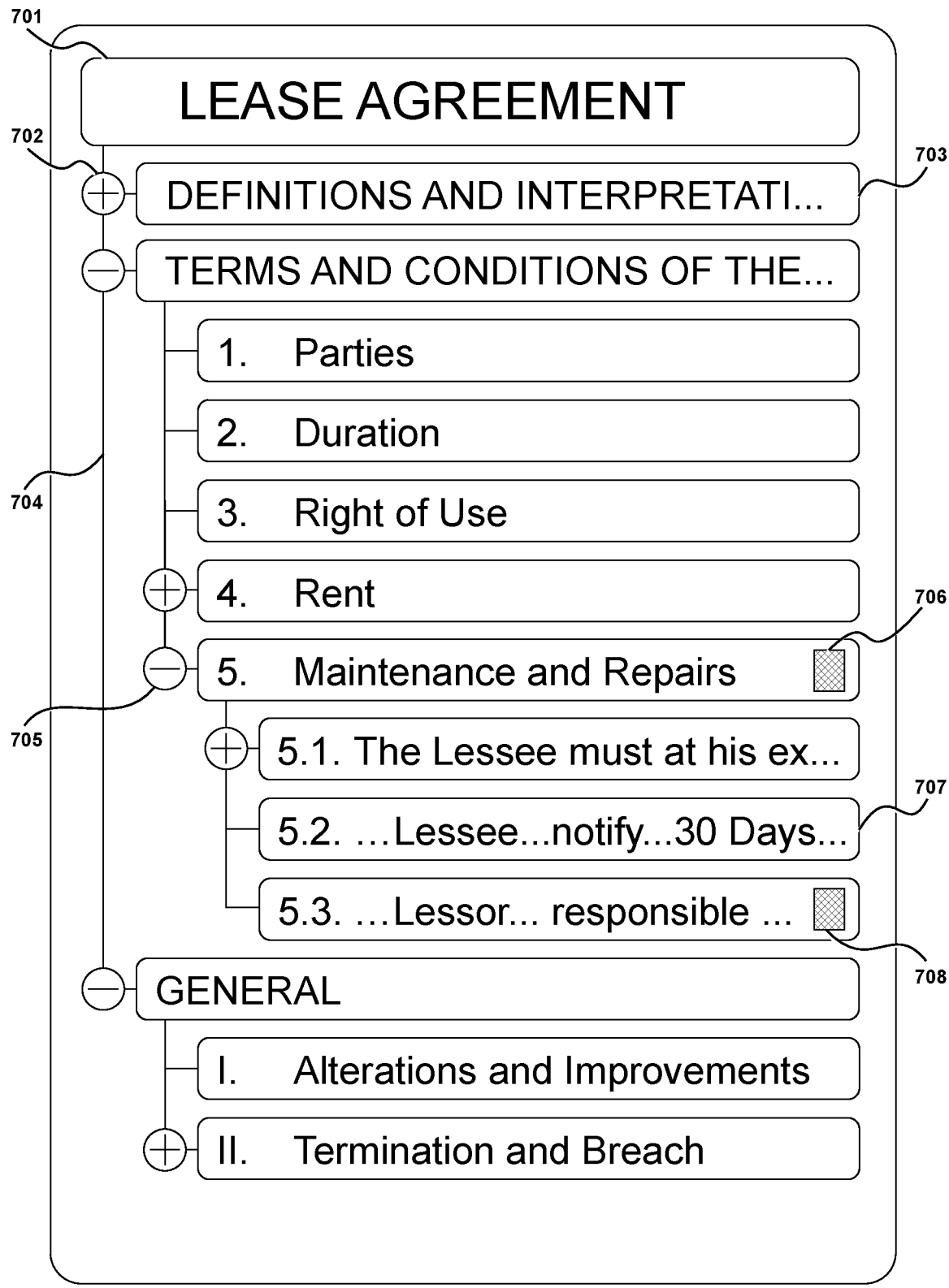
FIG. 7 shows an example display that may be generated in accordance with one or more illustrative aspects described herein.

A document map view may be displayed by the computing device (such as FIG. 7). A user may be able to switch from the directory-navigation view to the document map view and vice-versa. If the document map view is displayed, the computing device may switch from a view containing a hierarchical entity to a view containing any other hierarchical entity of the document.

The user interface may include translation functionality. For example, the user may be able to give input that causes the content of the document and/or the textual explanation of the relevant passages to be translated to a different language and/or displayed in a different language.

In some aspects the SVI may be displayed in an application (e.g., a browser program) running in a computing device (e.g., a touch screen device). The user may select the source option that allows the user to upload a document. The document may be locally stored in the computing device. The user may upload a document such as the example document (shown in FIG. 2-A) to a web server. The document may be processed by the web-server, and the sections/subsections depicted in FIG. 2-B may be identified by the web-server. The SVI may display the section hierarchies of the document. For example the SVI may display the section hierarchies in a directory-like form. For example, the display may look as depicted in FIG. 3.

FIG. 2-B depicts an example group of hierarchies, sections, and subsections that may be identified in a document. The hierarchies, the sections and the subsections that may be identified by the system described herein are depicted in the FIG. 2-B with left-side-rounded shapes similar to the shape 203, wherein each shape is placed at the left side of the corresponding section/subsection in the document of FIG. 2-A (partially depicted in the element 201). Element 201 is partially cut out by the cut line 202 due to space constraints.

In FIG. 3, the display 301 of the computing device is depicted with a directory-navigation view of the document. A directory-navigation view may include a header panel, such as header panel 302, which may contain a portion of the title of the document, a portion of text from a section hierarchy, a portion of text from a section, a portion of text from a subsection within the document, and/or any other portion of text from the document. A directory-navigation view may contain a number of child panels (e.g., such as child panel 303). The child panels may contain a portion of a title of a section, subsection, hierarchy, or any other portion of a document (e.g., the hierarchies of the document). A directory-navigation view may contain an interface element corresponding to each child panel (such as the button 304). The interface element corresponding to a child panel may cause the computing device to display text associated with text that is previewed in the panels at the right of each button. For example, selecting button 304 may cause the computing device to display text contained in the "Definitions and Interpretations" hierarchy. A directory-navigation view may contain one or more body panels (e.g., body panel 307 displayed in the child panel 306), which may contain a portion of text from the body of a document, section hierarchy, section or subsection, and/or any other portion of text from the document. For example, body panel 307 contains text from the body of the second hierarchy of the document displayed in FIG. 2-A.

As an example, if the user performs an action on button 305 of the initial directory-navigation view, then a hierarchy directory-navigation view of the second hierarchy (depicted in FIG. 4) may be shown to the user. In this example, the hierarchy directory-navigation view may include the header panel 401, which may contain a first preview content of the title of the second hierarchy. A directory-navigation view may include a button (such as the button 410), which may cause the computing device to perform the "BACK" history move, e.g., to display the initial directory-navigation view. A directory-navigation view may include a button (such as the button 402), which may cause the computing device to perform the "UP" neighboring move, e.g., to visualize the initial directory-navigation view. A directory-navigation view may include a body panel such as the body panel 403. Body panel 403 contains a second preview content of the body of the second hierarchy. A directory-navigation view may include an interface element, such as the button 404, which may cause the computing device to switch between displaying the preview content (as depicted in body panel 403) and displaying the full content of the body text corresponding to body panel 403. A directory-navigation view may include one or more child panels such as the child panel 405. In this example, child panel 405 contains a preview content of the headings of the sections of the second hierarchy. A directory-navigation view may include one or more interface elements such as button 406. In this example, button 406 may cause the computing device to display the section previewed in the panel at the right of button 406. In some implementations, panels such as 405 may be "active", e.g., an action performed by the user on a panel may cause the computing device to display the section previewed in the panel.

A directory-navigation view may include one or more visual indicia such as the colored band 408. In this example colored band 408 may indicate to a user the presence of a relevant passage in section "5." of the document. A directory-navigation view may include a visual representation of a swiping-up control, such as visual representation 400. In this example, visual representation 400 may allow the user to visualize the first hierarchy in a further directory-navigation view. A directory-navigation view may include a visual representation of the swiping-down control such as visual representation 409. The swiping down control may cause the computing device to display a subsequent hierarchy, section, subsection, or any other portion of text in a document. In the example depicted by FIG. 4, the swiping-down control may cause the computing device to display the third hierarchy in a directory-navigation view. It is noted that, although in the particular case described above the performing of an "UP" move has the same result as the performing of a "BACK" move, the two actions may in some cases have different results and offer the user a greater mobility in the document. In some cases the UP move may have the same result as the BACK move.

In this example, if the user performs an action on the button 407 of the hierarchy directory-navigation view, then a section directory-navigation view of the section "5" (depicted in FIG. 5-A) may be displayed by the computing device. In the example depicted in FIG. 5-A, the section directory-navigation view includes (1) the header panel 501 containing a preview content of the title of the section "5"; (2) the child panel 503 described in further detail below; (3) the button 504, which may allow the user to switch between the viewing of a preview and of the full content of the section "5.2"; (4) the child panel 510 containing a preview of the section "5.3"; (5) the preview switch 511, which may allow the user to switch between the viewing of a preview and of the full content of section "5.3"; (6) a visual representation 500 of the swiping-up control of the "PREVIOUS" neighboring move; and (7) a visual representation 513 of the swiping-down control of the "NEXT" neighboring move.

A child panel such as child panel 503 may contain some or all of the following: (a) preview content such as the preview content "The Lessee must notify the Lessor in writing within 30 Days" of section "5.2"; (b) a sub-panel, such as sub-panel 507, may contain a relevant passage of the document; (c) visual indicia, such as the colored band 508, which may indicate to the user that a sub-panel, such as sub-panel 507 contains the relevant passage; (d) a sub-panel such as sub-panel 509, which may contain passage information that may include a warning icon and a textual explanation containing the reasons for the relevance of the passage; (e) additional indicia, such as vertical ellipsis 505, which may indicate to the user that some text at the top of the passage is hidden; and/or (f) a button such as button 506 which may allow the user to switch between the viewing and the hiding of the text at the top of the relevant passage of the previous point (e).

The document may include an inline numbered list—such as the list outlined with the fine-dashed line 512. The list may be displayed in an extended form, e.g., with a new line before each point of the list, in order to facilitate the reading and enhance the comprehension. For example, the list may appear as depicted within line 512.

If the user performs a language-pop-up action on a language-pop-up button—not depicted in the figures, the language pop-up panel 514 of FIG. 5-B may be shown. In this language panel, the user may select the entry of a translation language (e.g., Spanish translation language outlined with element 515). Consequently, the text of the section directory-navigation view, including text of the hierarchical entities and/or the explanations, may be presented to the user in the selected translation language as depicted in FIG. 5-C.

Aspects described herein may further provide translation advantages in presenting the documents to the users in a translation language (hereinafter "translation advantages"), as described hereinafter. A translation advantage may include a computational time improvement in translating the document into the translation language, given that a computing device may present the users a portion of the text of the document at one time. The text displayed to the user at a certain time may be less than the entire text of the document because (1) in each view, a display may be limited to one hierarchical entity and its children hierarchical entities, instead of the entire document; and (2) a portion of the text content of the hierarchy elements may be shown as a preview and/or may be hidden.

For example, in a real-time translating implementation, the text of the hierarchy elements displayed in the SVI may be translated in real-time and/or may be responsive to each action of the user. To give a practical example, the full text content may be automatically translated into the translation language after the user performs actions to cause the computing device to fully show the text content.

Additionally/alternatively, in a background translating implementation, the operation of translation of the text of hierarchy elements may be performed in background while showing certain views of the SVI to the users, e.g., in order to obtain better overall performances.

Another translation advantage may include (1) the adoption of the visual distinctive marks of the relevant passages (which, may be symbolic, and may not need to be translated), and (2) the passage information. The passage information may include text and/or textual explanations(s), which, for example, may be generated from pre-defined tables in each language that is supported. Therefore, the advantage provided by the unconventional and innovative approach of aspects described herein may include improving a user's comprehension of the documents and may include situations where one or more document languages is not familiar or even unknown to the user.

Figure 11:
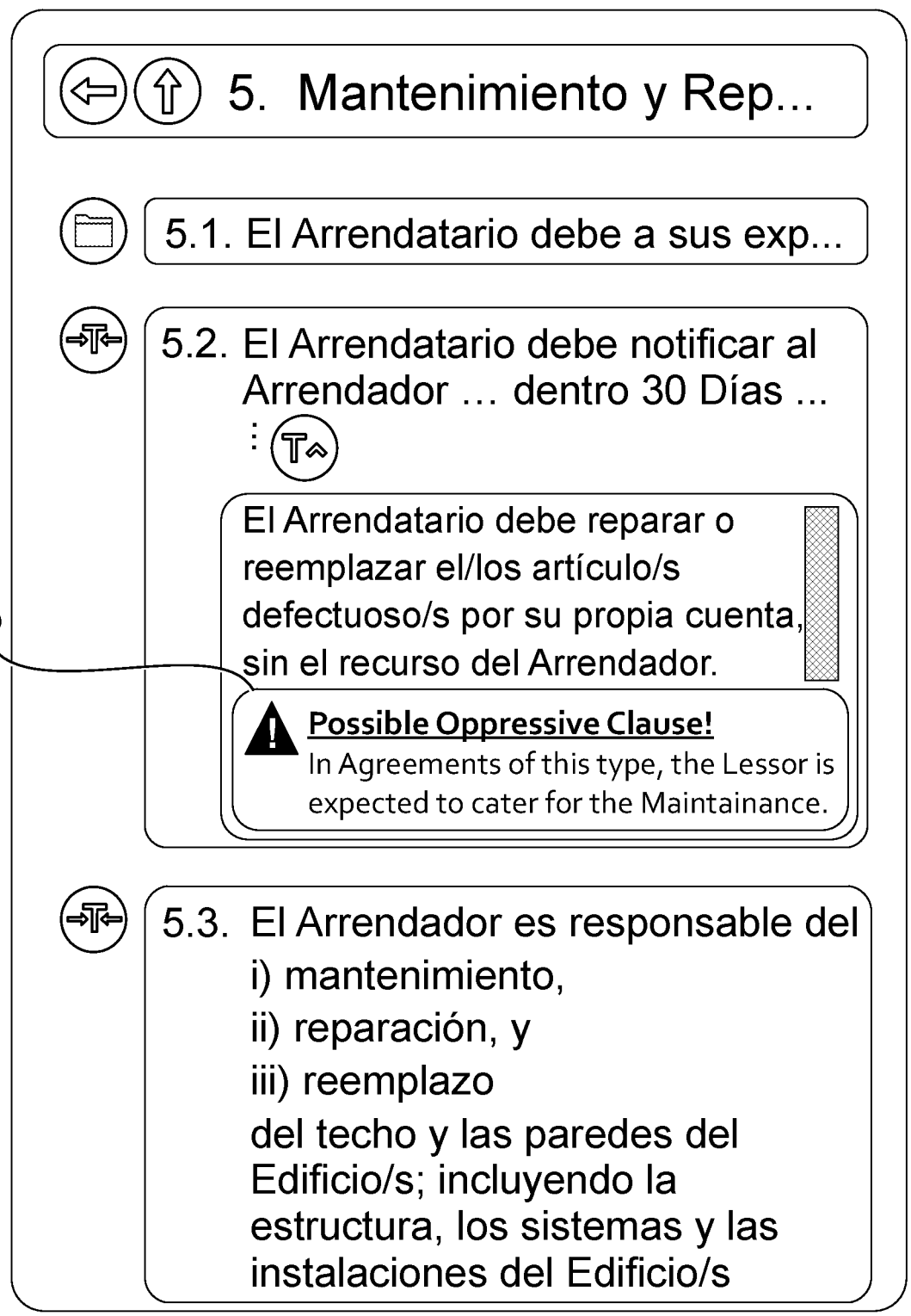
FIG. 11 shows an example display of a document in a first language and a warning in a second language (in this example, English) that may be generated in accordance with one or more illustrative aspects described herein.

In some implementations (1) the text of the document may be displayed in the document language(s), and (2) the textual explanations may be displayed in the translation language. For example, if the document displayed in FIG. 11 is read by a user that (a) knows the English language, and (b) does not know the Spanish language, the user may benefit of the presence of the warning 1100 (in English language) related to a possible oppressive clause in the document, even if the text of the document is displayed in Spanish language. This implementation may reduce the disadvantages of inaccuracy of an automated translation of the document.

If the user, from the view depicted in FIG. 5-C, (1) again performs the language-pop-up action, and then (2) selects the English language entry in the language pop-up panel, the section directory-navigation may be shown as depicted in FIG. 5-A.

Referring to the section directory-navigation view of FIG. 5-A, if the user performs the swiping-up action 500, then a section directory-navigation view of the section "4" (depicted in the FIG. 5-D) may be shown to the user. It is noted that in this view controls such as 502 and 504 may not be needed and thus might not be displayed since the size of the portion of the view area may be large enough to visualize the full content of each subsection of section "4". For this reason, in this and other similar cases the screen space available to the leaf subsections may be increased.

Figure 6:
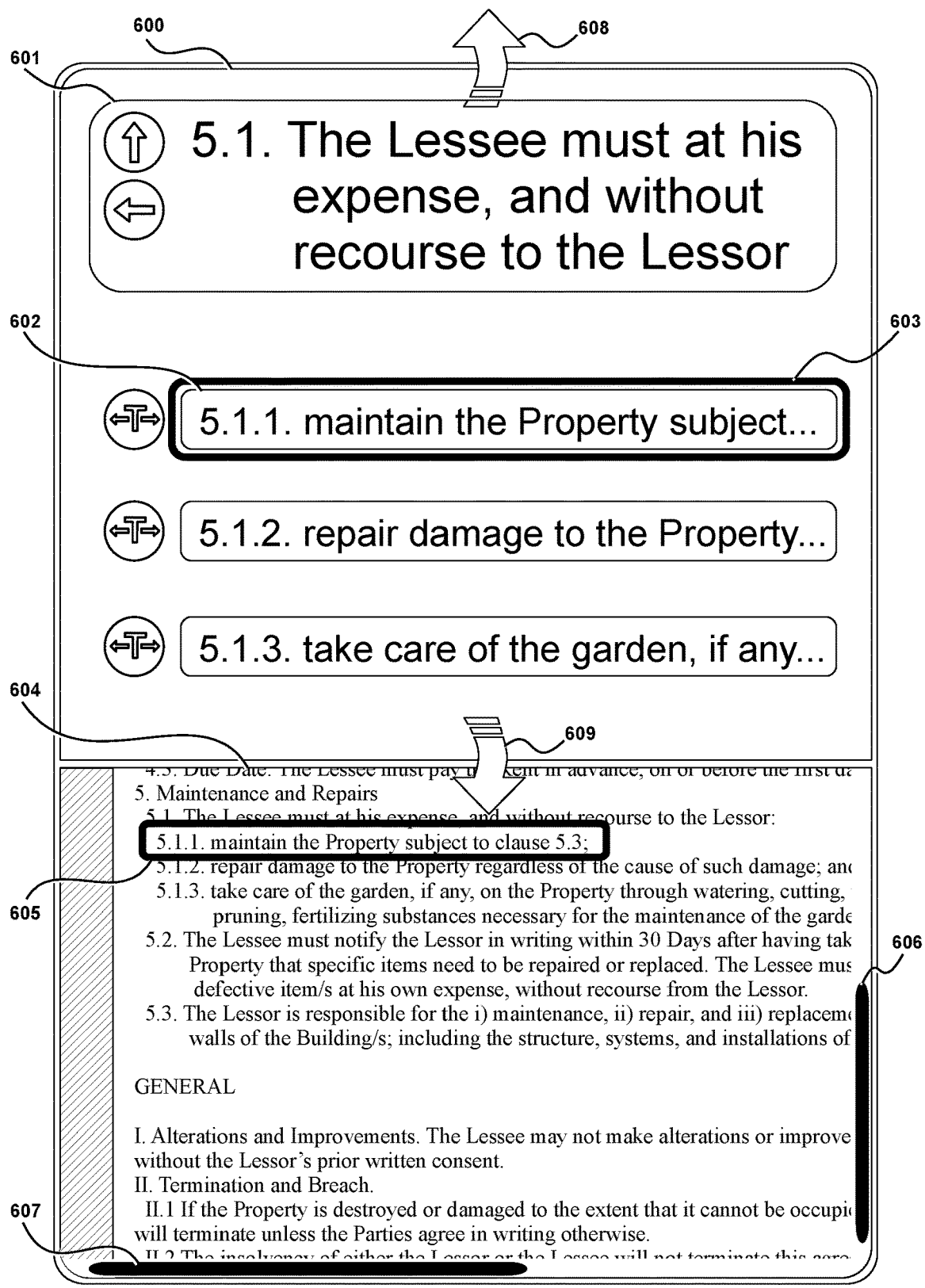
FIG. 6 shows an example display that may be generated in accordance with one or more illustrative aspects described herein.

In this view, if the user performs an action on the button 516, then a "BACK" history move may be performed and the directory-navigation of FIG. 5-A may be shown again. Subsequently, if the user performs an action on the button 502 of the section directory-navigation view of the section "5", then a subsection directory-navigation view 600 (depicted in FIG. 6) of the subsection "5.1" may be shown to the user. The subsection directory-navigation view may include (1) the header panel 601, which may contain a preview content of the header and the body of the subsection "5.1"; (2) one or more child panels such as the child panel 602, which may contain preview content of children subsections of the subsection "5.1"; (3) a visual representation 608 of the swiping-up control of the "PREVIOUS" neighboring move; and/or (4) a visual representation 609 of the swiping-down control of the "NEXT" neighboring move.

In aspects described herein, a functionality to enter the double-view mode may be available to the user. The user may, for example, perform an action on a view-mode switch button (not depicted in the Figures for brevity) of the SVI in order to enter the double-view mode depicted in FIG. 6. In the double-view mode, the computing device may display an original layout view 604 below the directory-navigation view 600. The user may view the original layout of the document in the original layout view, and the user may use the vertical scroll bar 606 and the horizontal scroll bar 607 to view different parts of the document. As an additional functionality to aid the navigation in the double-view mode, if the user performs an action on the child panel 602, then (a) 602 may be highlighted with the indicator 603, and/or (b) the corresponding text of the document in the original layout may be highlighted with the indicator 605. It is noted that in the double-view mode the user may perform the actions of swiping-up and/or swiping-down—referred to in the description of the subsection directory-navigation view—on the portion of screen 600 occupied by the directory-navigation view.

A document map view may be available to the user. The user may, for example, perform an action on a document-map switch button (not depicted in the Figures for brevity) of the SVI in order to cause the computing device to display the document map view, an example of which is depicted in FIG. 7. The user may decide, for example, to switch from the section directory-navigation view of FIG. 5-A to the document map view in FIG. 7. For example, the user may use the document map view to view a target hierarchy entity which may appear—to the user's perception—too far from the currently-viewed hierarchy entity to be conveniently reached with the local navigation, (e.g., the user may believe that it would require too many neighboring and/or history moves to display the target hierarchy entity starting from the hierarchy entity that is currently displayed).

In the document map view, the hierarchy structure of the document may be displayed in a tree structure view, which may include (i) a root panel 701 containing the title of the document, (ii) nested section/subsection panels (e.g., 703 and the like), (iii) a plurality of tree visual elements (e.g., element 704 and the like, which may connect the panels of the view), and/or (iv) a plurality of controls (e.g., 702, 705, and the like), which may allow the user to expand and collapse the panels, e.g., to switch between the displaying and the hiding of the children subsections of the sections/subsections of the panels. The colored bands 706 and 708 may indicate to the user that one or more panels of section(s) and/or subsection(s) contain relevant passages. In the panel 707, an example of preview content of the subsection "5.2." is shown, in which relevant words and word-groups of the body text of the subsection "5.2." (i.e., "Lessee", "notify" and "30 Days") are displayed, separated by ellipsis (" . . . "). The user may navigate the panels in the document map view and visualize a target panel; if the user performs an action on the target panel, a target directory-navigation view of the hierarchy entity of said target panel may be shown to the user. One or more words/word-groups may be detected to be relevant and included in the preview content, for example, by utilizing criteria analogous to the above-described warning criteria based on the relative semantic weight.

Some aspects described herein may be provided with device adaptive techniques. The device adaptive techniques may automatically detect certain features of the device in which the web application is visualized, and may present to the user a SVI adapted to the features detected.

Figure 8:
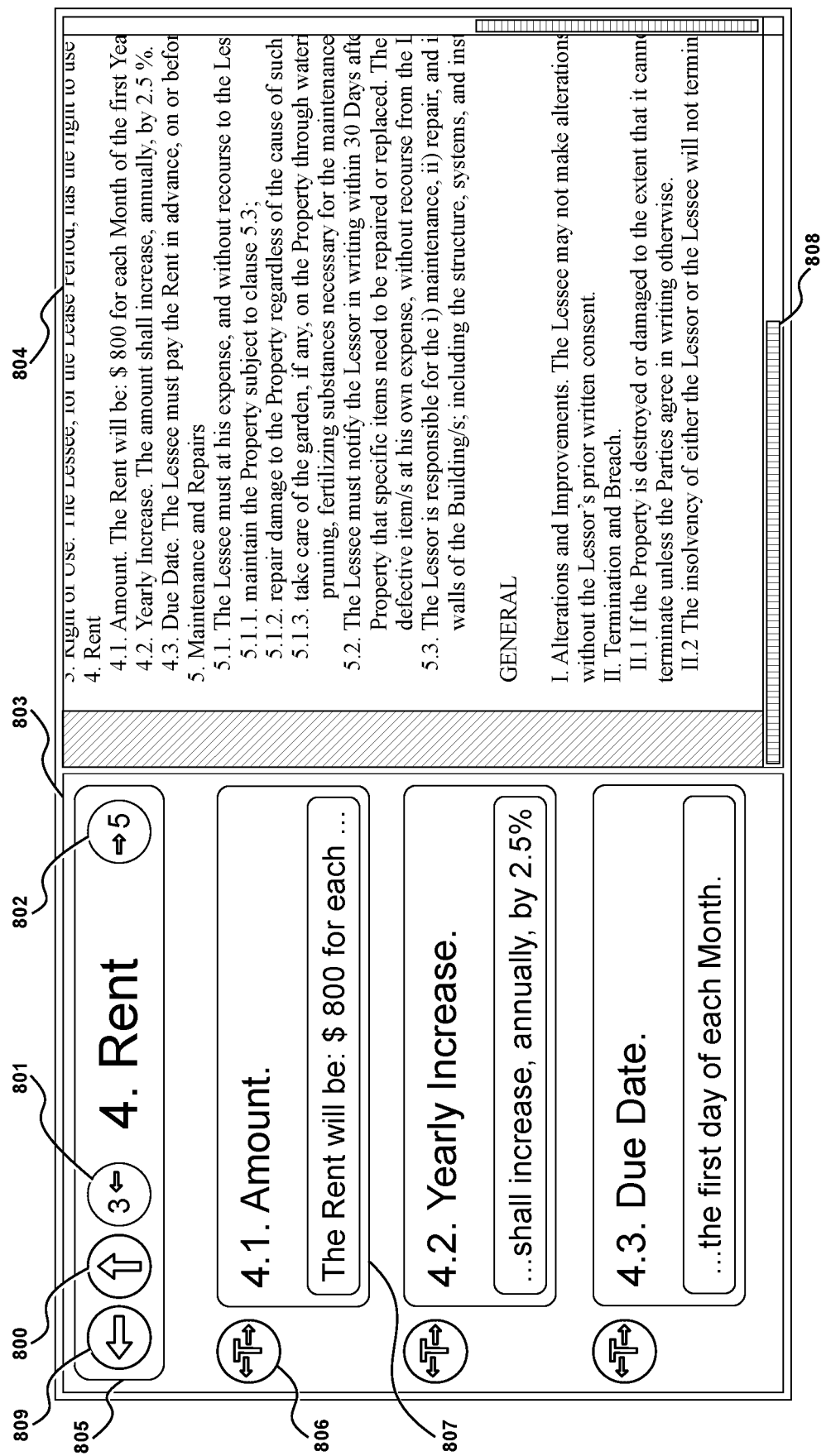
FIG. 8 shows an example display that may be generated in accordance with one or more illustrative aspects described herein.

If, for example, a web application is utilized in a desktop device with no support for touch gestures, the interface depicted in FIG. 8 may be presented to the user. The double view of the original layout (804) and of the directory-navigation view (803) may be conveniently visualized thanks to the width of the desktop screen, which may be greater than the portion of view area available in other devices. The user may scroll the document in its original layout through scroll bar controls such as control 808. The hierarchy entities displayed in the directory-navigation view may correspond to the hierarchy entity shown at the top of the original layout view, e.g., the section "4." in the example display shown in FIG. 8. In a heading panel, such as heading panel 805, the heading of the section may be shown with the button control 800 (implementing the "UP" neighboring move) and the button control 809 (implementing the "BACK" history move), also displayed in analogous views described in this disclosure. Furthermore, the heading 805 may include controls that may be used in devices such as non-touch devices. For example, the button 801, may implement the control of the "PREVIOUS" neighboring move (in this example, allowing the user to view the section "3."). As an additional example, the button 802, may implement the control of the "NEXT" neighboring move (in this example, allowing the user to view the section "5."). The children panel 807 (and the like) and the button 806 (and the like) may have the same functions of the analogous panels and buttons depicted in FIG. 5-A.

In some aspects, an augmented reality (AR) computer application may be provided to the user. The AR computer application may be executed in the AR device 902 depicted in FIG. 9-A. It is noted that in the AR device depicted in FIGS. 9-A, 9-B, and 9-C, the views are depicted as duplicated in both the right and left lens solely for purposes of representation rather than limitation.

In some aspects described herein, a user may follow the steps below to view the document in FIG. 2-A in the SVI of the AR computer application. If the AR computer application processes the document displayed in FIG. 2-A, the SVI may present the user the section hierarchies of the document in an AR initial directory-navigation view depicted in FIG. 9-A, which may include elements analogous to the elements in FIG. 3. In this AR view, elements such as header panel 900 and child panel 903 may overlap the background view of the world surrounding the user, which may, for example, perform an action on elements such as 901—e.g., through a finger gesture detected with finger tracking techniques—in order to perform an "EXPAND" neighboring move. Compared to the child panel 306 of FIG. 3, the child panel 903 might not contain the body panel 307. The preview content of the body of the hierarchy related to the child panel 903 may be displayed to the user in a subsequent AR view, for example, if the user performs navigation actions to this end.

Figure 4:
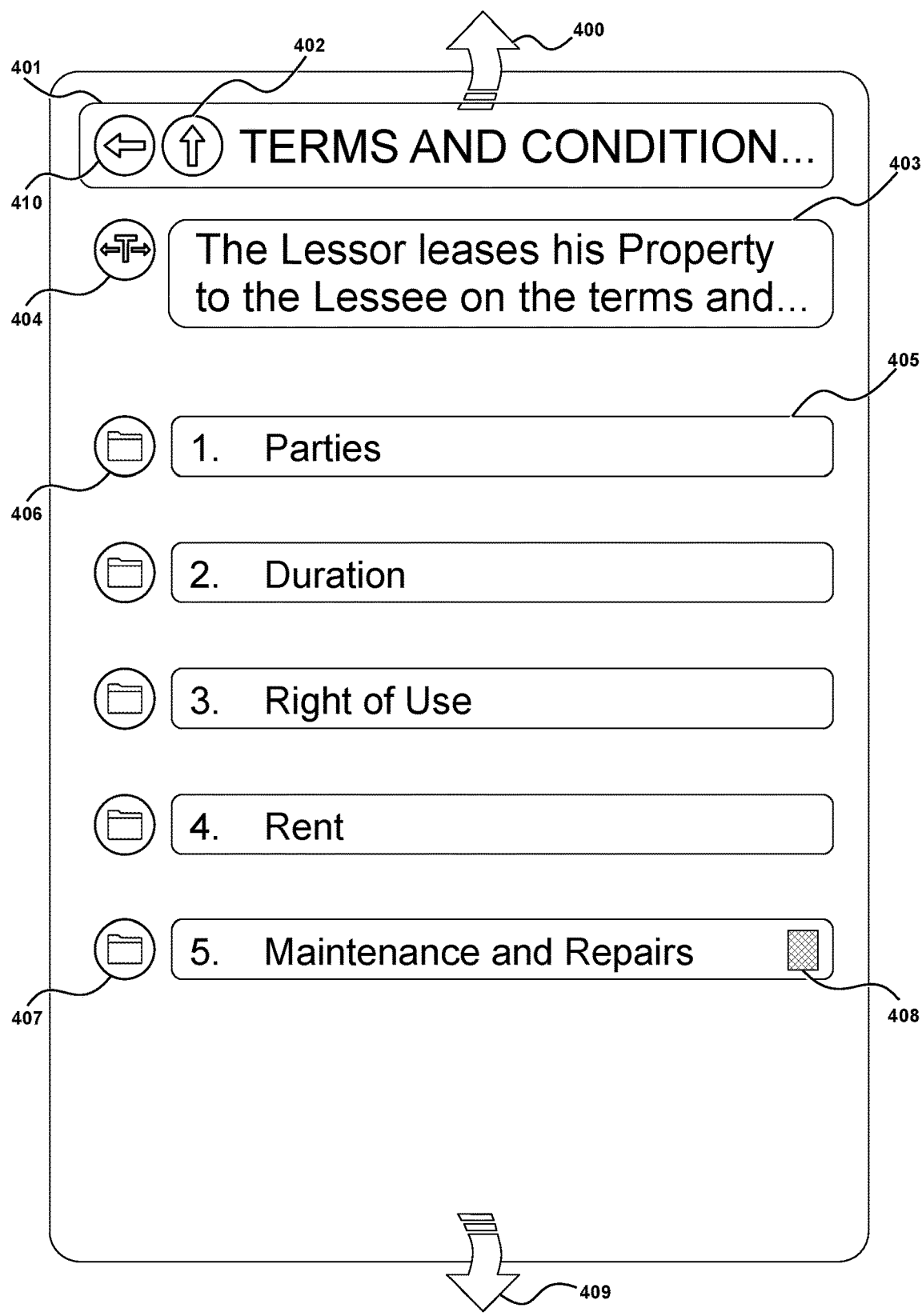
FIG. 4 shows an example display that may be generated in accordance with one or more illustrative aspects described herein.

If the user performs an action on 901, an AR hierarchy directory-navigation view depicted in FIG. 9-B—which includes elements analogous to the elements in FIG. 4—may be shown to the user. Elements 904 and 907 in FIG. 9-B may have functions analogous to the buttons 402 and 410 of FIG. 4, although the elements may be positioned differently.

Compared to the view of FIG. 4, in this AR view the full content of the body panel may or may not be shown, nevertheless such content may be available to be shown to the user in a first AR body view after he/she performs an action on the element 905. The AR body views are not depicted in FIGS. 9-B and 9-C for clarity of the drawing. In addition to the full content of the body panel, the first AR body view may show or not show the full content of the header panel 909. The presence of the relevant passage in the section "5." of the document may be indicated to the user by the icon 906 at the left of the corresponding section panel.

If the user performs an action on the element 908 of the AR hierarchy directory-navigation view, an AR section directory-navigation view depicted in FIG. 9-C—which includes elements analogous to the elements in FIG. 5-A— may be shown to the user. Some differences between the views of FIG. 5-A and FIG. 9-C may include: (1) the preview content of each child subsection of FIG. 9-C may be limited to the last consecutive number of the subsection identifier; and (2) the child panels related to the subsections "5.2." and "5.3" may be presented to the user through a one-line preview content in the corresponding header panels of FIG. 9-C. Additional content of said subsections "5.2" and "5.3" may be shown to the user in subsequent AR view(s), e.g., if the user performs navigation actions to this end. After the user performs an action on the element 910, a second AR body view—which may include the full content of the header panel 911—may be shown. The presence of the relevant passage in the subsection "5.2." of the document may be indicated to the user by an icon such as the icon 912. The icon may be displayed at the left of the corresponding subsection panel.

Further AR directory-navigation views of the document may be similar to other views described above. In some aspects, adaptations analogous to the ones shown in FIGS. 9-A, 9-B and/or 9-C may be adopted.

Aspects described may allow the viewing and navigation of documents from devices that have a small or reduced viewing area. Furthermore, the aspects described may be used in a device that may benefit from reducing the view area of each view of the application as much as possible, in order to leave more space to the background.

Figure 10:
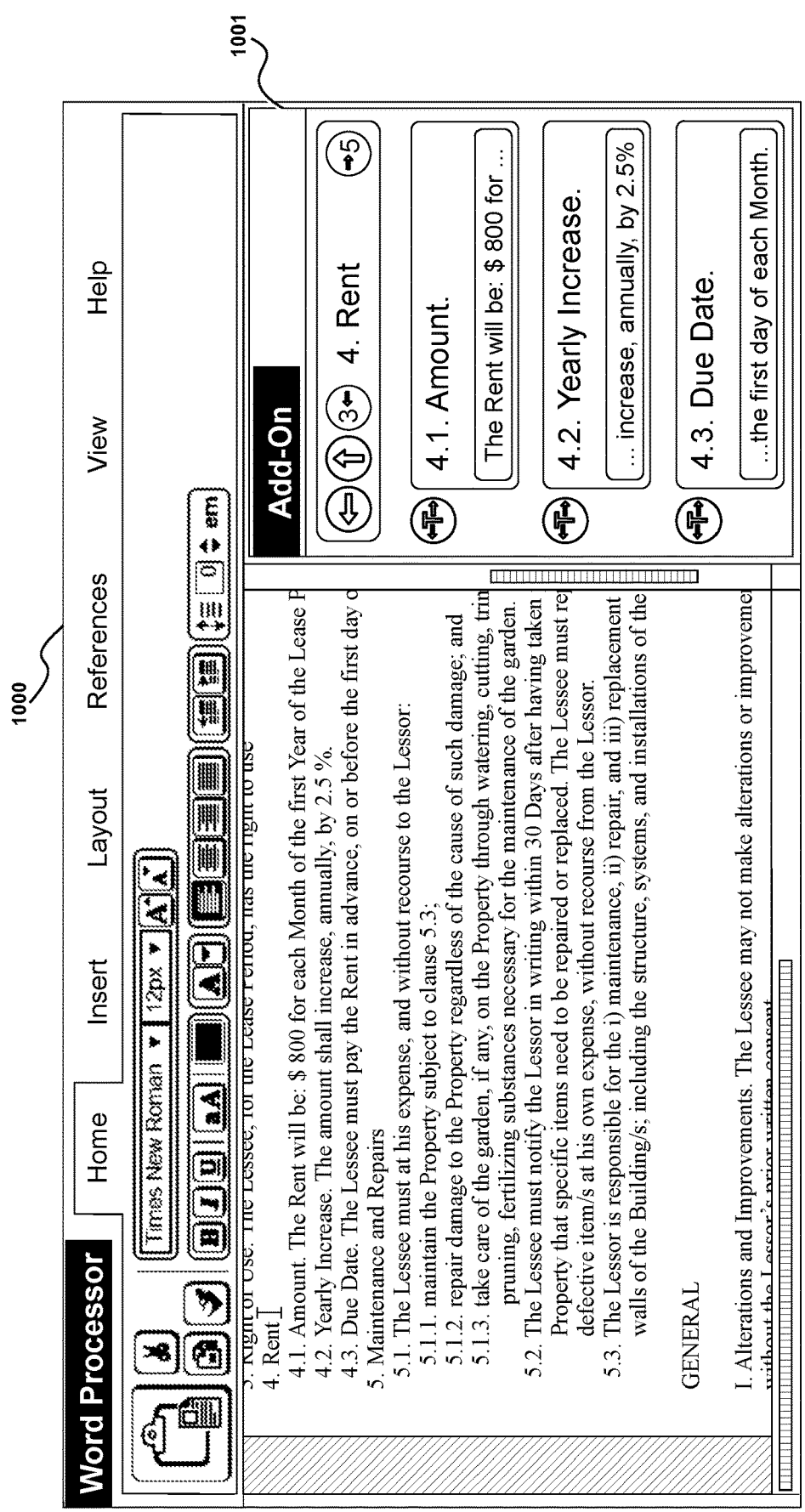
FIG. 10 shows an example display that may be generated in accordance with one or more illustrative aspects described herein.

Aspects described may be implemented as an add-on of a word processor program, depicted in 1000 of FIG. 10. The user of the word processor may use, for example, the add-on to navigate the document of FIG. 2-A from the add-on panel 1001, e.g., as described in the desktop application of FIG. 8. From the add-on panel 1001, for example, the relevant passages and the passage information may be shown to the user as described in FIG. 5-A.

Furthermore, the user may, for example, select a translation language from a language pop-up panel (not depicted in the Figures for brevity) in order to visualize the content preview and the passage information of the currently-viewed part of the document in the user selected language. The user may read the currently-viewed part of document in the translation language from the add-on panel of the word processing program, while he/she is consulting and/or modifying the document from the main window of the word processing program.

For each of the examples of categories of documents listed in this disclosure, a corresponding example of usage of the invention is described below.

In some aspects, the system may follow the steps below to cause display, in a SVI, a hard copy of a document: (1) the user may use an optical device to scan the hard copy of the document; (2) the user may use optical character recognition (OCR) software to convert the image scanned into a text-based file; (3) the user may load the text-based file into the computer application; and (4) the user may navigate the document in the SVI implemented in the computer application.

In some aspects, the system may follow steps (3) and (4) described in the immediately preceding paragraph in order to cause display, in a SVI, a text-based file stored in the local storage of a device. In some aspects, the system may follow the steps below in order to cause display, in a SVI, the license agreement of a third-party application during the installation process of said third-party application: (1) the user may install the third-party application in a computing device; (2) at the step of accepting the license agreement of the third-party application, the user may perform an action (e.g., the user may click a button of the interface of the third-party application) in order to cause display of the license agreement in a SVI implemented as a web service; and (3) after reading the license agreement in the SVI, the user may decide whether to continue the installation process or not.

In some aspects, the system may follow the steps below in order to cause display, in a SVI, the last version of the terms and conditions of a popular third-party application of interest for the user: (1) the user may select the agreement of the popular application from a list of agreements of popular third-party applications; and (2) the user may navigate the agreement in a SVI.

The techniques utilized (i) to identify relevant passages, (ii) to detect the omission of key passages, (iii) to generate textual explanations, and/or (iv) to identify relevant words and word-groups of the preview content may include—by way of example and not limitation—techniques of (1) Text Pattern Recognition performed with Regular Expressions, (2) Generation of Regular Expressions based on Genetic Algorithms (e.g., as described in "Automatic Web Data Extraction based on Genetic Algorithms and Regular Expressions" by Barrero, Camacho, and R-Moreno, the entirety of which is herein incorporated by reference) and/or Neural Networks (e.g., as described in "Neural Generation of Regular Expressions from Natural Language with Minimal Domain Knowledge," by Locascio et al., the entirety of which is herein incorporated by reference), (3) Natural Language Processing (NLP) and Information Extraction (e.g., ontology-driven techniques), (4) Lexical Semantic Relatedness (e.g., as described in "Using a Weighted Semantic Network for Lexical Semantic Relatedness" by Siblini and Kosseim, the entirety of which is herein incorporated by reference), and (5) Artificial (e.g., Convolutional) Neural Network for Text Classification (e.g., as described in "Convolutional Neural Networks for Sentence Classification," by Yoon Kim, the entirety of which is herein incorporated by reference).

It is noted that the effectiveness of the techniques mentioned in the immediately preceding paragraph may increase thanks to the preliminary identifying of hierarchy(ies), section(s), and subsection(s) of the document described in this disclosure and in U.S. application Ser. No. 16/152,384.

For example, (i) the "don't" clause patterns, (ii) the "do" clause patterns, and/or (iii) a number of patterns for identifying the words and/or word-groups in order to calculate the degree of relevance of a passage may be regular expression patterns. The regular expression patterns may be pre-defined patterns that match or do not match with part(s) of text of the document. Pre-defined tables of regular expression patterns may be, for example, (a) manually built and/or improved, (b) built and/or improved through a human-based training process, and/or (c) automatically built and/or improved without operator intervention. For example, the tables of regular expression patterns may be populated with the the aid of human experts (1) in the legal contracts of certain countries and/or world zones, (2) in specific legal areas (e.g., lease agreements, insurance contracts, etc.), and/or (3) in lexical semantics for a specific language. Additionally/alternatively, the tables of regular expression patterns may be automatically built and/or improved, for example, through techniques that utilize genetic algorithms (e.g., with techniques analogous to the ones implemented in Regex Generator++, in the Genetic-regex library, and/or in the Wordhierarchy library). Additionally/alternatively, the tables of regular expression patterns may be automatically built and/or improved, for example, through techniques that utilize neural networks (e.g., with techniques analogous to the ones implemented in the DeepRegex library as described in "Neural Generation of Regular Expressions from Natural Language with Minimal Domain Knowledge," by Locascio et al., the entirety of which is herein incorporated by reference). Additionally/alternatively, the tables of regular expression patterns may be automatically built and/or improved through techniques of text normalization, edit-distance, lemmatization, Regex Named Entity Recognition (e.g., with techniques analogous to the ones implemented in Stanford CoreNLP).

For example, the warning criteria and/or the omission criteria may be based on NLP techniques such as (1) tokenization, (2) sentence splitting, (3) lemmatization, (4) parts-of-speech tagging, (5) named entity recognition, (6) constituency parsing, (7) dependency parsing, (8) coreference resolution, (9) open information extraction, (10) sentiment recognition, and/or (11) relation extraction (e.g., with techniques analogous to the ones implemented in Stanford CoreNLP, as described in "The Stanford CoreNLP Natural Language Processing Toolkit," the entirety of which is herein incorporated by reference). For example, the relevance of words and word groups may be calculated through Lexical Semantic Relatedness techniques similar to WordNet Similarity for Java (WS4J). Additionally/alternatively, the relevance of a passage and/or the warning criteria may be based on an implementation similar to Convolutional Neural Network for Text Classification in Tensorflow.

Additionally/alternatively, the knowledge-base utilized in the above-mentioned techniques may be populated and/or integrated with lexical, ontology and/or other types of data and/or of metadata. The semantic domain of said data and/or metadata may or may not be (a) restricted to the legal Semantic Area, and/or (b) localized in certain countries and/or world zones (e.g., WordNet, JurWordNet, Legal and Advice Sector Metadata, Metalex, Lexml project, and Legalxml).

The present invention is not limited to the embodiments and the implementations described herein; reference should be had to the appended claims. Aspects of the disclosure may operate on particularly created hardware, firmware, digital signal processors, or on a specially programmed computer including a processor operating according to programmed instructions. The terms controller or processor as used herein are intended to include microprocessors, microcomputers, quantum computers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Program modules may include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, and/or Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, may include any media that can be accessed by a computing device. By way of example, and not limitation, computer-readable media may comprise computer storage media and communication media.

Computer storage media may include any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media may mean any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

All described embodiments and features of the present invention may be combined with each other in any arbitrary manner, except where as described to be exclusive or known to those of skill in the art as technically unable to be combined.

The invention claimed is:

1. A method comprising:
    determining, by a computing device, section hierarchies of a document, wherein each hierarchy comprises a plurality of sections;
    identifying, within the document, a text segment as a relevant passage based on at least one warning criteria or at least one omission criteria, wherein the text segment is included in a first section of the document corresponding to a first hierarchy of the section hierarchies, and wherein the text segment is identified as the relevant passage based on:
        determining a degree of relevance of the content of the text segment using the at least one warning criteria, or determining language omitted from the document based on the content of the text segment and using the at least one omission criteria;

generating, by the computing device for display, a first hierarchical view of the first hierarchy, the first hierarchical view comprising:
- at least a portion of a hierarchy title corresponding to the first hierarchy;
- at least a portion of text, from the document, associated with each respective section of the plurality of sections associated with the first hierarchy;
- an interface element associated with a first section of the plurality of sections associated with the first hierarchy, wherein the first section comprises a plurality of subsections; and
- first visual indicia associated with the first section, wherein the first visual indicia indicates that the first section includes the identified text segment corresponding to the relevant passage identified based on the at least one warning criteria or the at least one omission criteria; and based on receiving a selection of the interface element corresponding to the first section, generating a second hierarchical view of the first section, the second hierarchical view comprising:
- at least a portion of text, from the document, associated with the first section;
- a first portion of text, from the document, associated with a first subsection of the first section;
- a second portion of text, from the document, associated with the first subsection, wherein the second portion of text comprises the identified text segment;
- a warning panel indicating one or more warning criteria or one or more omission criteria associated with the relevant passage; and
- second visual indicia associated with the second portion of text, wherein the second visual indicia indicates that the second portion of text corresponds to the warning panel.

2. The method of claim 1, wherein the second hierarchical view further comprises a subsection button, the method further comprising:
based on receiving selection of the subsection button, generating a third hierarchical view comprising:
- at least a portion of text associated with the first subsection;
- at least a portion of text associated with a first sub subsection of the first subsection; and
- a document panel configured to, after receiving input corresponding to the portion of text associated with the first sub subsection, display a portion of the document corresponding to the first sub subsection.

3. The method of claim 2, wherein the document panel is further configured to, after receiving input corresponding to the portion of text associated with the first sub subsection, display a third visual indicia overlaying the display of the portion of the document corresponding to the first sub subsection.

4. The method of claim 1, wherein the second hierarchical view further comprises a translation button, and wherein the method further comprises:
based on receiving a selection of the translation button, generating a third view that comprises a translation of the second hierarchical view into a different language.

5. The method of claim 1, further comprising:
determining that the first portion of text comprises an inline enumerated list without new lines between each item; and
displaying each item in the inline enumerated list on a separate line within the second hierarchical view.

6. The method of claim 1, wherein the warning panel comprises a textual explanation corresponding to the one or more warning criteria or the one or more omission criteria.

7. The method of claim 1, further comprising:
generating, by the computing device for display, a third hierarchical view of the section hierarchies comprising:
- at least a portion of the hierarchy title corresponding to the first hierarchy;
- at least a portion of a second hierarchy title corresponding to a second hierarchy;
- a button associated with the second hierarchy title;
- at least a portion of text associated with a title of the first section; and
- the second portion of text associated with the first subsection.

8. The method of claim 1, wherein the text segment is identified as the relevant passage based on determining that the degree of relevance satisfies a relevance threshold.

9. The method of claim 7, wherein the third hierarchical view further comprises a third visual indicia adjacent to the second portion of text associated with the first subsection, wherein the third visual indicia is indicative of the one or more warning criteria or the one or more omission criteria.

10. The method of claim 7, further comprising:
based on receiving a selection of the button associated with the second hierarchy title, displaying at least a portion of a second section contained in the second hierarchy.

11. The method of claim 1, wherein the computing device is one of a laptop computer, a notebook computer, a desktop computer, a tablet computer, a smart phone, a personal digital assistant (PDA), a cellular telephone, a mobile computing device, a portable media player, a Wi-Fi mobile platform, a portable e-Reader, a portable game player, a game console, a television set, an Internet appliance, a virtual reality device, an augmented reality device, a smart watch, or a quantum computer.

12. An apparatus comprising:
one or more processors; and
memory storing machine readable instructions that, when executed by the one or more processors, cause the apparatus to:
- determine, by a computing device, section hierarchies of a document, wherein each hierarchy comprises a plurality of sections;
- identify, within the document, a text segment as a relevant passage based on at least one warning criteria, wherein the text segment is identified as the relevant passage based on determining a degree of relevance of the content of the text segment using the at least one warning criteria, wherein the text segment is included in a first section of the document corresponding to a first hierarchy of the section hierarchies;
- generate, by the computing device for display, a first hierarchical view of the first hierarchy, the first hierarchical view comprising:
  - at least a portion of a hierarchy title corresponding to the first hierarchy;
  - at least a portion of text, from the document, associated with each respective section of the plurality of sections associated with the first hierarchy;

an interface element associated with a first section of the plurality of sections associated with the first hierarchy, wherein the first section comprises a plurality of subsections; and first visual indicia associated with the first section, wherein the first visual indicia indicates that the first section includes the identified text segment corresponding to the relevant passage identified based on the at least one warning criteria; and based on receiving a selection of the interface element corresponding to the first section, generate a second hierarchical view of the first section, the second hierarchical view comprising:

at least a portion of text, from the document, associated with the first section;

a first portion of text, from the document, associated with a first subsection of the first section;

a second portion of text, from the document, associated with the first subsection, wherein the second portion of text comprises the identified text segment;

a warning panel indicating one or more warning criteria associated with the relevant passage; and second visual indicia associated with the second portion of text, wherein the second visual indicia indicates that the second portion of text corresponds to the warning panel.

13. The apparatus of claim 12, wherein the second hierarchical view further comprises a translation button; and wherein the instructions, when executed by the one or more processors, further cause the apparatus to:

based on receiving a selection of the translation button, generate a third view that comprises a translation of the second hierarchical view into a different language.

14. The apparatus of claim 12, wherein the instructions, when executed by the one or more processors, further cause the apparatus to:

determine that the first portion of text comprises an inline enumerated list without new lines between each item; and display each item in the inline enumerated list on a separate line within the second hierarchical view.

15. The apparatus of claim 12, wherein the text segment is identified as the relevant passage based on determining that the degree of relevance satisfies a relevance threshold.

16. The method of claim 1, wherein the text segment is identified as the relevant passage based on content of the text segment matching a regular expression pattern.

17. The method of claim 1, wherein the text segment is identified as the relevant passage based on applying natural language processing to content of the text segment.

18. The method of claim 1, wherein the text segment is identified as the relevant passage based on comparing the content of the text segment to content of at least one other document.

19. The method of claim 1, wherein the text segment is identified as the relevant passage based on output of at least one neural network.

20. A non-transitory computer readable medium storing instructions that, when executed by at least one processor, cause a computing device to perform steps comprising:

determining, by a computing device, section hierarchies of a document, wherein each hierarchy comprises a plurality of sections;

identifying, within the document, a text segment as a relevant passage based on at least one omission criteria adapted to identify language omitted from the document, wherein the text segment is identified as the relevant passage based on the content of the text segment and the omission criteria, wherein the text segment is included in a first section of the document corresponding to a first hierarchy of the section hierarchies;

generating, by the computing device for display, a first hierarchical view of the first hierarchy, the first hierarchical view comprising:

at least a portion of a hierarchy title corresponding to the first hierarchy;

at least a portion of text, from the document, associated with each respective section of the plurality of sections associated with the first hierarchy;

an interface element associated with a first section of the plurality of sections associated with the first hierarchy, wherein the first section comprises a plurality of subsections; and first visual indicia associated with the first section, wherein the first visual indicia indicates that the first section includes the identified text segment corresponding to the relevant passage identified based on the at least one omission criteria; and based on receiving a selection of the interface element corresponding to the first section, generating a second hierarchical view of the first section, the second hierarchical view comprising:

at least a portion of text, from the document, associated with the first section;

a first portion of text, from the document, associated with a first subsection of the first section;

a second portion of text, from the document, associated with the first subsection, wherein the second portion of text comprises the identified text segment;

a warning panel indicating one or more omission criteria associated with the relevant passage; and second visual indicia associated with the second portion of text, wherein the second visual indicia indicates that the second portion of text corresponds to the warning panel.

21. The computer readable medium of claim 20, wherein the text segment is identified as the relevant passage based on comparing the content of the text segment to content of at least one other document.

* * * * *